(12) United States Patent
Cashman et al.

(10) Patent No.: US 10,129,237 B2
(45) Date of Patent: *Nov. 13, 2018

(54) SYSTEM AND METHOD INVOKING SECURITY AND PROFILE UTILITIES FOR GLOBAL ACCOUNT REGISTRATION

(71) Applicant: HARTFORD FIRE INSURANCE COMPANY, Hartford, CT (US)

(72) Inventors: Mark S. Cashman, Windsor, CT (US); Cornell N. Bogdan, West Springfield, MA (US); James A. Madison, Windsor, CT (US); Hugh J. Quinn, West Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 356 days.

This patent is subject to a terminal disclaimer.

(21) Appl. No.: 14/974,931

(22) Filed: Dec. 18, 2015

(65) Prior Publication Data
US 2016/0105421 A1   Apr. 14, 2016

Related U.S. Application Data

(63) Continuation of application No. 14/581,605, filed on Dec. 23, 2014, now Pat. No. 9,219,738, which is a
(Continued)

(51) Int. Cl.
*G06F 9/455* (2018.01)
*H04L 29/06* (2006.01)
(Continued)

(52) U.S. Cl.
CPC ...... *H04L 63/0815* (2013.01); *G06F 21/6218* (2013.01); *G06Q 40/08* (2013.01);
(Continued)

(58) Field of Classification Search
USPC ....... 703/2, 22; 705/4, 5, 3; 717/106; 726/2, 726/9
See application file for complete search history.

(56) References Cited

U.S. PATENT DOCUMENTS 7,086,085 B1   8/2006 Brown et al.
7,210,163 B2   4/2007 Stoll
(Continued)

*Primary Examiner* — Thai Phan
(74) *Attorney, Agent, or Firm* — Howard IP Law Group

(57) ABSTRACT

Systems and methods are disclosed herein for managing electronic access from remote devices to a plurality of back-end computer platforms. The system includes a front-end computing system connected to the plurality of computerized back-end services by a data network, the front-end computer system including a network interface, a profile utility, and security utility. The network interface is configured to receive a registration request for a user identity. The front-end computer system invokes services of the security utility to verify information concerning the user identity and to register a global user account for the user. The front-end computer system invokes the profile utility to merge or link pre-existing user accounts associated with the user identity for the plurality of computerized back-end services. The front-end computer system also invokes the profile utility to determine roles for the user identity in relation to each of the computerized back-end services.

20 Claims, 10 Drawing Sheets

Related U.S. Application Data continuation of application No. 13/298,015, filed on Nov. 16, 2011, now Pat. No. 8,918,306.

(51) Int. Cl.
*G06F 21/62* (2013.01)
*G06Q 40/08* (2012.01)

(52) U.S. Cl.
CPC ............ *H04L 63/08* (2013.01); *H04L 63/102* (2013.01); *H04L 63/126* (2013.01); *G06F 9/45504* (2013.01); *G06F 2221/2117* (2013.01); *G06F 2221/2141* (2013.01)

(56) References Cited

U.S. PATENT DOCUMENTS

| | | |
|---|---|---|
| 7,428,750 B1 | 9/2008 | Dunn et al. |
| 7,814,330 B2 | 10/2010 | Wong |
| 8,069,061 B2 | 11/2011 | Heidel |
| 8,918,306 B2 * | 12/2014 | Cashman ............... H04L 63/08 703/2 |
| 9,219,738 B2 * | 12/2015 | Cashman ............... H04L 63/08 |
| 2002/0029194 A1 | 3/2002 | Lewis et al. |
| 2003/0149781 A1 | 8/2003 | Yared et al. |
| 2010/0023349 A1 | 1/2010 | Heidel |
| 2010/0030580 A1 | 2/2010 | Salwan |
| 2011/0055913 A1 | 3/2011 | Wong |
| 2011/0276430 A1 | 11/2011 | Vyas et al. |
| 2013/0125211 A1 | 5/2013 | Cashman et al. |
| 2015/0121475 A1 * | 4/2015 | Cashman ............... H04L 63/08 726/4 |

\* cited by examiner

SYSTEM AND METHOD INVOKING SECURITY AND PROFILE UTILITIES FOR GLOBAL ACCOUNT REGISTRATION

CROSS-REFERENCE TO RELATED APPLICATIONS

This application is a continuation of co-pending U.S. patent application Ser. No. 14/581,605 entitled System for Providing Dynamic Portal Transaction Authentication and Authorization, filed Dec. 23, 2014, which is a continuation of U.S. patent application Ser. No. 13/298,015, filed Nov. 16, 2011, now U.S. Pat. No. 8,918,306, the entirety of which is incorporated herein by reference for all purposes.

FIELD OF THE INVENTION

In general, the invention relates to systems and methods for computerized user self-registration, authentication, and authorization for access to a number of computerized services offered by an insurance company.

BACKGROUND OF THE INVENTION

Insurance companies provide a range of services to their customers. For example, an insurance company may offer workers' compensation insurance, property insurance, life insurance, vehicle insurance, and/or business insurance services to their customers. Further, insurance companies often offer related services, for example, mutual fund, annuity, college savings plan, and/or retirement plan services. Customers access and interact with these insurance services by accessing Internet websites and/or other electronic network resources maintained by the insurance company. For example, a user may change a level of coverage, deposit or withdraw funds, and/or change beneficiary information for a given insurance service using a website maintained by the insurance company for that service.

An insurance company may maintain substantial network resources (e.g., servers, databases, and information repositories) to provide customers with electronic access to these insurance services. However, the resources for different insurance services are typically located on different computing systems that may additionally operate on different information platforms. As a result, there is typically little or no information exchange among the individual computerized insurance services offered by an insurance company. The fragmented and disparate structure of typical insurance networks creates many inconveniences for insurance companies and their customers.

Typically, a customer's interactions with the insurance company are fragmented. For example, a user's online preferences and settings (e.g., with respect to a preferred mailing addresses, mode of contact, beneficiaries, and/or bank account information) enacted through one computerized insurance service are not readily available when the user uses another computerized insurance service of the same insurance company. Similarly, a user may be required to register separately for each insurance service and reenter his or her online preferences and settings for each service. The lack of a global profile management framework across all of the computerized insurance services offered by an insurance company inconveniences both the insurance company and its customers.

Further, it is difficult for the insurance company to maintain security across all of its insurance services. For example, actions that are indicative of fraud or trusted behavior with respect to a user's interactions with one computerized insurance service are not automatically shared with the other computerized insurance services offered by the company. For example, a user may act to increase security with respect to one of the computerized insurance services (e.g., by creating highly secure login credentials) in a manner that is not recognized by the other computerized insurance services. Similarly, activities that are indicative of fraud (e.g., multiple failed login attempts or access from a suspect IP address) that occur in relation to one computerized insurance service may not be recognized by the other computerized insurance services offered by the company. The lack of a global security framework for registration, authentication, and authorization across all of the computerized insurance services offered by an insurance company inconveniences both the insurance company and its customers.

SUMMARY

Therefore, there is a need for systems and methods to integrate the substantial networking and computing resources used by an insurance company to provide the range of insurance services described above. Specifically, there is a need to integrate security information and user profile information so that pertinent data is shared between all the insurance services in an automated, timely, and minimally intrusive manner. Further, there is a need to dynamically and globally update security information and user profile information based on user and non-user interactions that occur with respect to individual insurance services. By integrating networking and computing resources for the range of insurance services, an insurance company may provide more secure and accurate self-registration of a user of an insurance system, more secure and accurate authentication and authorization of user requested activities with the insurance system, and a simpler and more flexible interface from which a user can select preferences and other settings for the user's interactions with the insurance system.

Accordingly, systems and methods are disclosed herein for managing electronic access to a plurality of computerized insurance services. The system includes a processor, a network interface, and a memory. The network interface is configured to receive a user identity provided by a user remote to the system and an access request from the user to access a selected computerized insurance service from the plurality of computerized insurance services. The memory stores computer executable instructions which, when executed by the processor, cause the system to determine a set of access rights for the user based on the user identity and an insurance-related role associated with the user identity, as related to the selected computerized insurance service. The computer executable instructions, when executed by the processor, further cause the system to allow the user to access the selected computerized insurance service according to the access request only if the access requested is included in the determined set of access rights. At least two of the computerized insurance services are implemented on substantially different information platforms.

In some embodiments, the network interface is further configured to receive a user request to change the insurance-related role associated with the user identity from a first role to a second role. Further, in some embodiments, the first role and the second role are each selected from a personal role, a claimant role, a beneficiary role, an agent role, and a business role. In some embodiments, a plurality of insurance-related roles are associated with the user identity, and the network interface is further configured to receive a first request from the user to select a document delivery preference for documents of the selected computerized insurance service that are associated with a first of the plurality of insurance-related roles, and a second request from the user to select a document delivery preference for documents of the selected computerized insurance service that are associated with a second of the plurality of insurance-related roles. In some embodiments, a document delivery preference is selected from e-mail delivery, paper delivery, and fax delivery. Further, in some embodiments, the plurality of computerized insurance services comprises at least one non-property insurance service selected from a 401(k) retirement service and an annuity investment service.

In some embodiments, the computer executable instructions, when executed by the processor, further cause the processor to include an access right in the set of access rights only if an authentication score associated with the user identity is greater than a threshold value. Additionally, in some embodiments, the set of access rights is determined based on the selected computerized insurance service. Further, in some embodiments, the set of access rights includes a right to withdraw funds associated with the selected computerized insurance service and a right to modify beneficiary information associated with the selected computerized insurance service.

In some embodiments, the computer executable instructions, when executed by the processor, further cause the processor to determine the threshold value based on the selected computerized insurance service. Additionally, in some embodiments, the memory separately stores a threshold value for each of the plurality of computerized insurance services and retrieves the threshold value corresponding to the selected computerized insurance service. Further, in some embodiments, the threshold value is based on a device type from which the user identity was received, and the device type is one of a stationary computing device located in a private location, a stationary computing device located in a public area, and a handheld wireless mobile device.

In some embodiments, the computer executable instructions, when executed by the processor, further cause the processor to determine the authentication score by determining a base component and a dynamic component of the authentication score, where the base component is retrieved from the memory and represents activities associated with the user identity prior to receiving the access request, and the dynamic component represents activities associated with the user identity including and after receiving the access request. Still further, in some embodiments, the base component is determined based, at least in part, on one or more secure information items provided during a first-time registration of the user identity. Further, in some embodiments, the base component is determined based, at least in part, on a history of successful or unsuccessful login attempts associated with the user identity. Additionally, in some embodiments, the dynamic component is determined based on a device type from which the access request was received. In some embodiments, the dynamic component is automatically updated during a user activity session based on at least one non-user action that occurs during the activity session.

In some embodiments, the computer executable instructions, when executed by the processor, further cause the processor to prompt the user to provide information related to one or more previously established security credentials if the access requested is not included in the set of access rights. Further, in some embodiments, the computer executable instructions, when executed by the processor, further cause the processor to prompt the user to provide information for one or more secure information items if the access requested is not included in the set of access rights, update the authentication score in response to the user provided one or more secure information items, and update the set of access rights based, at least in part, on the updated authentication score. Additionally, in some embodiments, the computer executable instructions, when executed by the processor, further cause the processor to, prior to prompting a user to provide information for one or more secure information items, inform the user that the access requested is not allowed, and prompt the user the select a security credential type from a plurality of security credentials types that can be used to increase the authentication score.

Further, systems and methods are disclosed herein for managing user information related to a plurality of computerized insurance services. The system includes a processor, a database, a network interface, and a memory. The database stores user information for the plurality of computerized insurance services. The information stored in the database includes a plurality of user identities, and, for each user identity in the plurality of user identities, an indication of which of the plurality of computerized insurance services the user identity is registered for. The information stored in the database further includes, for a user identity in the plurality of user identities and a computerized insurance service for which the user identity is registered, a plurality of insurance-related roles associated with the user identity in relation to the computerized insurance service. The network interface is configured to receive a user identity and a request related to a selected one of the computerized insurance services provided by a user remote to the system. The memory stores computer executable instructions which, when executed by the processor, cause the system to determine an insurance-related role for the received user identity, identify a storage location in the database corresponding to the received user identity, the selected computerized information service, and the determined insurance-related role, retrieve, from the identified storage location, a first authentication score, calculate a second authentication score based, at least in part, on user activity with the selected computerized insurance service in relation to the received request, and store, in the identified storage location, the second authentication score in place of the first authentication score.

In some embodiments, the determined insurance-related role is selected from a personal role, a claimant role, a beneficiary role, an agent role, and a business role. Further, in some embodiments, the information stored in the database further comprises a plurality of document delivery preferences for a corresponding plurality of insurance-related roles for a given user identity, wherein at least one of the document delivery preferences is selected from e-mail delivery, paper delivery, and fax delivery. Additionally, in some embodiments, the computer executable instructions, when executed by the processor, further cause the processor to, in response to the storing of the second authentication score in place of the first authentication score, automatically store the second authentication score in another storage location of the database that corresponds to the received user identity, the determined insurance-related role, and a computerized insurance service other than the selected computerized insurance service.

BRIEF DESCRIPTION OF THE DRAWINGS

The foregoing discussion will be understood more readily from the following detailed description of the invention with reference to the following drawings.

DESCRIPTION OF CERTAIN ILLUSTRATIVE EMBODIMENTS

To provide an overall understanding of the invention, certain illustrative embodiments will now be described, including systems and methods for computerized user self-registration, authentication, and authorization for access to a number of computerized services offered by an insurance company. However, it will be understood by one of ordinary skill that the systems and methods described herein may be adapted and modified as is appropriate for the application being addressed and that the systems and methods described herein may be employed in other suitable applications, and that such other additions and modifications will not depart from the scope thereof.

The disclosure that follows describes, inter alia, techniques for granting access to secure features of computerized insurance services based on a set of user access rights. In particular, the disclosure relates to systems and methods for determining access rights for a user based on the user's previously established security credentials and temporary and permanent authentication step-up procedures. The user's set of access rights may change over time due to user interactions with the computerized insurance services and due to non-user events.

Figure 1:
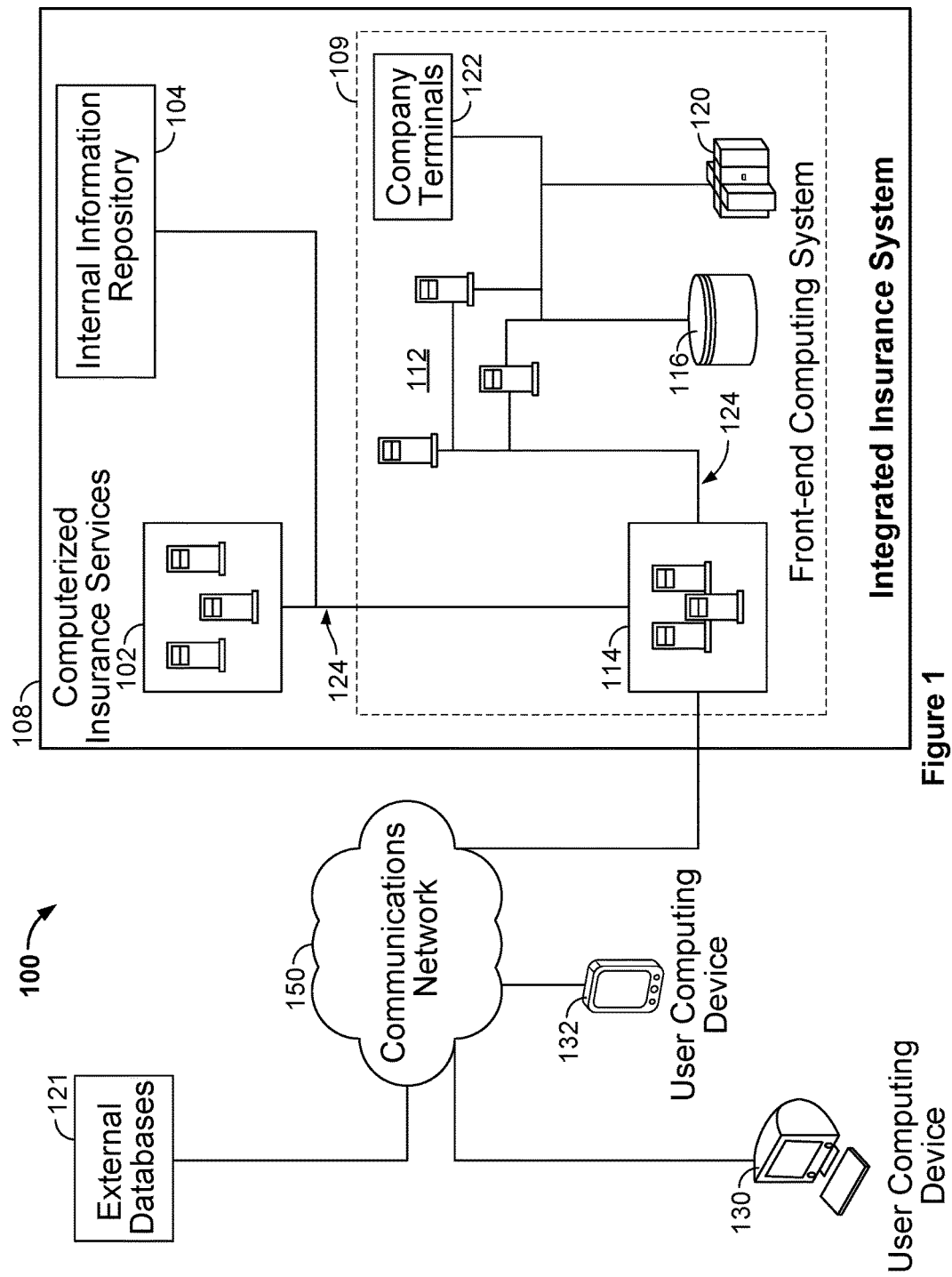
FIG. 1 is a block diagram of a system for performing user self-registration, authentication, and authorization to govern access to a number of computerized insurance services according to an illustrative embodiment of the invention.

FIG. 1 is a block diagram of a system 100 for performing user self-registration, authentication, and authorization to govern access to a number of computerized insurance services according to an illustrative embodiment of the invention. The system 100 includes an integrated insurance system 108 maintained by an insurance company. The integrated insurance system 108 includes a front-end computing system 109, computerized insurance services 102, and an internal information repository 104. These computing devices are connected by a local area network 124.

The front-end computing system 109 is an intermediary between customers of the insurance company and the computerized insurance services 102. The computerized insurance services 102 represents a plurality of separately maintained electronic insurance services. At least some of the individual services of the computerized insurance services 102 are maintained on separate computing systems (e.g., servers, databases, and information repositories) that operate on different, and generally incompatible, information platforms. Further, the various computerized insurance services of the computerized insurance services 102 may be located in the same information center (e.g., data processing facility) or may be spread out across multiple geographically separate information centers.

The computerized insurance services 102 may include, for example and without limitation, some or all of health insurance, fire insurance, life insurance, vehicle insurance, business insurance, mutual fund, annuity, college savings plan, and retirement plan services. Despite the fragmented nature of the individual insurance services included in the computerized insurance services 102, the integrated insurance system 108 provides a single integrated experience to customers of the insurance company by logically treating the computerized insurance services 102 as "back-end" services and arbitrating access to the back-end services using the front-end computing system 109.

To do so, the front-end computing system 109 allows customers of the insurance company to securely self-register for a single global network account (i.e., user-identity). The front-end computing system 109 then monitors and governs the user's subsequent access to each of computerized insurance services 102 for which the user has access rights. In some embodiments, new customers are required to self-register for this global user identity in place of creating specific accounts for the individual computerized insurance services 102. In some embodiments, users having existing "legacy" accounts for some or all of the computerized insurance services 102 are requested or required to merge those accounts into a new global account based on a global user identity. In some embodiments, the computerized insurance services 102 includes at least one insurance service that is implemented on a legacy information platform that is directly accessible by entering a corresponding Internet address into a web browser and at least one insurance service that is accessible only through a global portal available to those who have registered for a global user identity.

Once registered for a global account, customers may manage security and profile preferences and settings through a single global user interface provided by the integrated insurance system 108. Changes made through the global interface are automatically effective for each of the other computerized insurance services of the computerized insurance services 102, so that preferences and settings are uniform across all of the computerized insurance services used by a given customer.

Further, the front-end computing system 109 manages self-registration, authentication, and authorization functions across all of the computerized insurance services 102. The front-end computing system 109 also maintains global information on user profiles (e.g., with respect to a preferred mailing addresses, mode of contact, beneficiaries, and/or bank account information) and roles associated with the user profiles.

The front-end computing system 109 also monitors and detects actions that are indicative of fraud or trusted behavior that occur in relation to a user's identity with one of the computerized insurance services 102 and applies this information globally to the other computerized insurance services. For example, a user may take action to increase his security level with respective to one computerized insurance service (e.g., by providing a biometric identifier or creating highly secure login credentials). As another example, events may occur that are indicative of fraud (e.g., repeated failed login attempts or access from a new IP address) with respect to one of the computerized insurance services 102. In both cases, the front-end computing system 109 collects this information and applies it globally to modify a temporary and/or longer term trust level associated with the user identity (i.e., in the form of an authentication score, as will be described subsequently). The front-end computing service may automatically query the individual computerized insurance services 102 to collect this information. Additionally or alternatively, the individual computerized insurance services 102 may automatically, without being queried, send data to the front-end computing system to provide this information.

To perform these and other functions, the front-end computing system 109 includes a plurality of integrated system servers 112, a network interface 114, an insurance company database 116, a processing unit 120, and company terminals 122. The front-end computing system 109 is also communicatively coupled to an internal information repository 104. These computing devices are connected by the local area network 124.

The network interface 114 is responsible for receiving user access requests related to the computerized insurance services 102 and distributing the requests among the integrated system servers 112. The integrated system servers 112 receive data from the network interface 114 and manage the data to provide integrative functionality as described above. To do so, the integrated system servers 112 execute computer executable instructions for a user profile module, a security module, and a portal module using one or more processors, as will be further described subsequently.

The insurance company database 116 stores information related to registered users of the front-end computing system 109. For each user identity registered with the front-end computing system 109, the database 116 may store, for example and without limitation, security information including an authentication score for each of a plurality of roles associated with the user identity, security credentials previously established for the user identity, and historical interactions of the user identity with the front-end computing system 109 and the computerized insurance services 102. Further, for each user identity registered with the front-end computing system 109, the database 116 may store, for example and without limitation, user profile information including document delivery preferences, contact preferences, beneficiary information, and policy information for the user identity. Further details on the implementation of the database 116, in accordance with some embodiments, are further discussed in relation to FIG. 10. In some embodiments, the database 116 is not located within the front-end computing system 109, but instead, is communicatively connected to the front-end computing system 109 via the communications network 150. In this case, appropriate security controls (e.g., secure http connections) are used to ensure that data stored in the database 116 is not retrieved or otherwise obtained by unintended parties.

The processing unit 120 executes computer executable instructions to support the user self-registration, authentication, and authorization functions of the front-end computing system 109. The processing unit 120 includes one or more processors. For example, the processing unit 120 may include an authentication score processor for determining and updating an authentication score associated with a given user identity and role from data obtained from the database 116, the integrated system servers 112, and/or from an internal information repository 104. The processing unit 120 also includes an access rights processor that determines access rights (e.g., read and write access rights) for a user identity to a given one of the computerized insurance services 102 (based on, among other things, an authentication score). An exemplary implementation of a computing device for use in the front-end computing system 109 is discussed in greater detail in relation to FIG. 2.

The company terminals 122 allow insurance company employees to interact with the integrated insurance system 108 through various user interfaces displayed on the company terminals 122. The interfaces include, for example and without limitation, interfaces to review and manually adjust user profile data, security data, historical user transaction data, and to retrieve data related to insurance policies. The interfaces may be integrated into one or more websites for managing the integrated insurance system 108 or they may be integrated into thin or thick software clients or stand alone software. The company terminals 122 can be any computing devices suitable for carrying out the processes described above, including personal computers, laptop computers, tablet computers, smartphones, servers, and other computing devices. In some embodiments, different insurance company employees may be given different access privileges. For example, marketing employees may only be able to retrieve information on insurance policies but not to make any changes to insurance policy data.

The front-end computing system 109 may obtain information from one or more public or private databases in order to perform self-registration, authentication, authorization, and other related functions. For example, the front-end computing system 109 may compare data provided by a user during a self-registration process to information available from public or private record databases (e.g., driving records, tax records, criminal records, and financial records). Similarly, the front-end computing system 109 may connect to one or more public or private databases to generate challenge questions or access remotely generated security credentials such as RSA or Captcha™ credentials.

In the illustration of FIG. 1, the front-end computing system 109 is connected to private database, i.e., the internal information repository 104, that is maintained by the insurance company. The internal information repository 104 may store past insurance claim information for a user of the integrated insurance system 109, and some of this information may be used to establish one or more security credentials for the user. As further illustrated in FIG. 1, the front-end computing system 109 is also connected to external databases 121. The external databases 121 generally include both public and private (e.g., subscription-based) databases. The physical locations of the individual databases of the external databases 121 may span a wide geographic area.

User computing devices 130 and 132 provide various user interfaces for customers to interact with the integrated insurance system 108 over the communications network 150. Current and potential customers interact with the user computing devices 130 and 132 to access the features of the computerized insurance services 102. For example, a user may use the user computing device 130 to view and/or modify information related to a life insurance policy, register for new insurance services, or merge existing legacy insurance accounts. A user may use user computing device 130 to authenticate themselves to the integrated insurance system 108, either on a temporary or permanent basis, or to perform any other suitable insurance function as described in the disclosure herein.

The data exchange between the front-end computing system 109 and the other computing devices and systems in FIG. 1 can occur using push and pull technologies where the integrated system servers 112 of the integrated insurance system 108 can act as both a server and client. In some embodiments, the integrated system servers 112 can request to receive periodic data feeds from the computerized insurance services 102, company terminals 122, the internal information repository 104, and/or user computing devices 130 and 132. The communication between the integrated system servers 112 and the other computing devices and system in FIG. 1 can follow various known communication protocols, such as TCP/IP, cellular protocols including GSM, Wi-Fi, Wi-Max, or other wireless communications technologies or combination of wired or wireless channels.

In general, data exchanges between the front-end computing system 109 and the individual computerized insurance services of the computerized insurance services 102 may be initiated by either the front-end computing system 109 or the individual computerized insurance services. Further, in cases where the front-end computing system 109 uses a different instruction set compared to the computerized insurance service to which it is communicating, instructions may be translated by the transmitting party (i.e., either of the front-end computing system 109 or the computerized insurance service) into a format easily interpretable by the receiving party. For example, instructions may be translated using an application programming interface (API).

Figure 2:
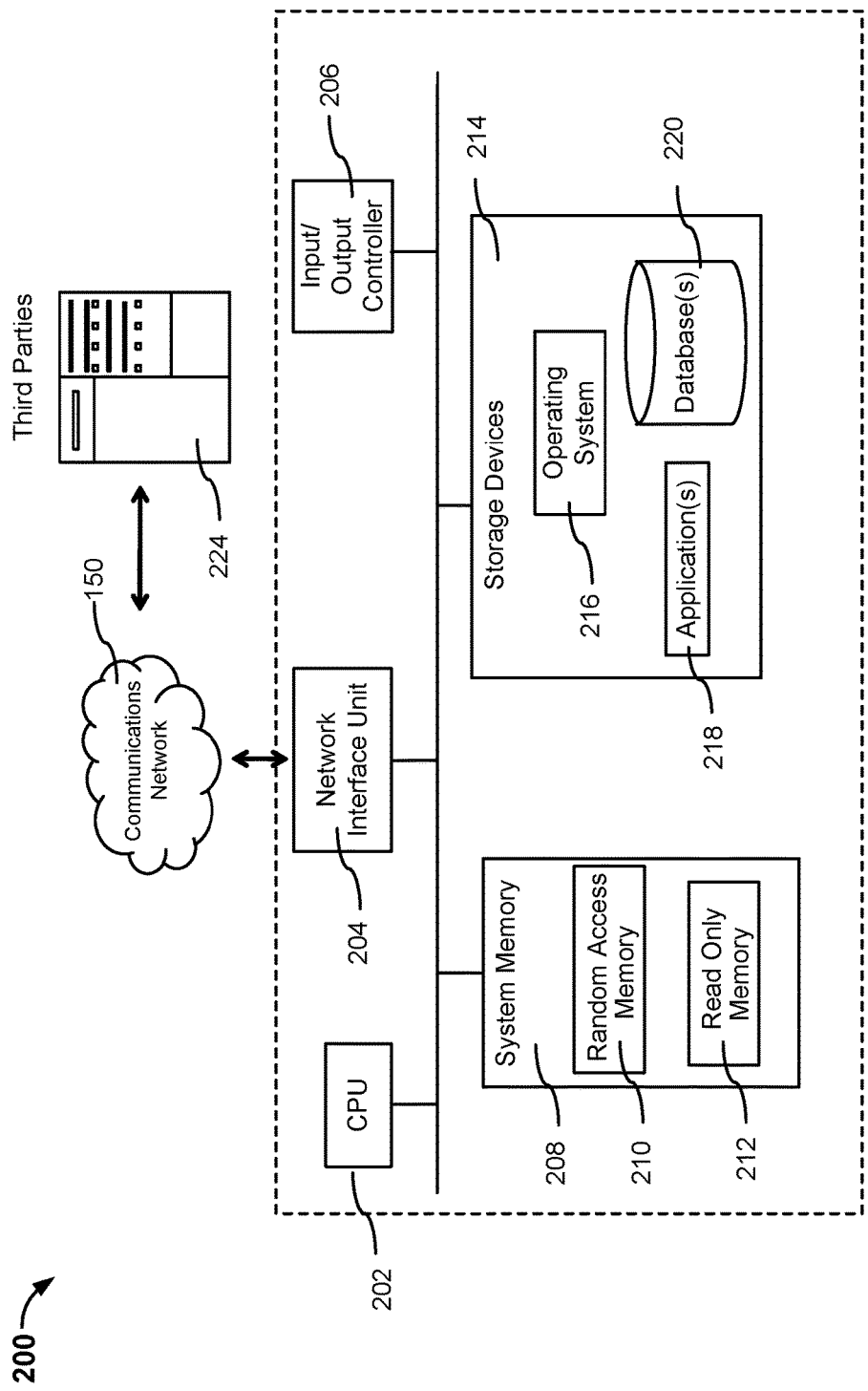
FIG. 2 is a block diagram of a computing device used for carrying out at least some of the business logic processing described in relation to FIG. 1 according to an illustrative embodiment of the invention.

FIG. 2 is a block diagram of a computing device 200 used for carrying out at least some of the business logic processing described in relation to FIG. 1 according to an illustrative embodiment of the invention. The computing device 200 comprises at least one network interface unit 204, an input/output controller 206, system memory 208, and one or more data storage devices 214. The system memory 208 includes at least one random access memory (RAM) 210 and at least one read-only memory (ROM) 212. All of these elements are in communication with a central processing unit (CPU) 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the business logic processing described above in relation to FIG. 1, or these functions may be distributed across multiple computer systems and architectures. In the embodiment shown in FIG. 1, the computing device 200 is linked, via communications network 150 or local area network 124 to other servers or systems housed by the integrated insurance system 108, such as the network interface 114, and the integrated system servers 112. The computing device 200 interfaces with third parties 224 through the communications network 150. Third parties 224 may include one or both of user computing devices 130 and 132.

The computing device 200 may be configured in a distributed architecture, where databases and processors are housed in separate units or locations. The computing device 200 may also be implemented as a server located either on site at an insurance company or external to the insurance company. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors, and one or more supplementary co-processors, such as math co-processors, for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating an authentication score associated with a user identity and role. The same computing device 200 or another similar computing device may be configured for comparing an authentication score to a threshold authentication value. The same computing device 200 or another similar computing device may be configured for self-registering a user for a global user identity on the front-end computing system 109.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may include all or a subset of data stored in insurance company database 116 as well as additional data, such as formulas or manual adjustments.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
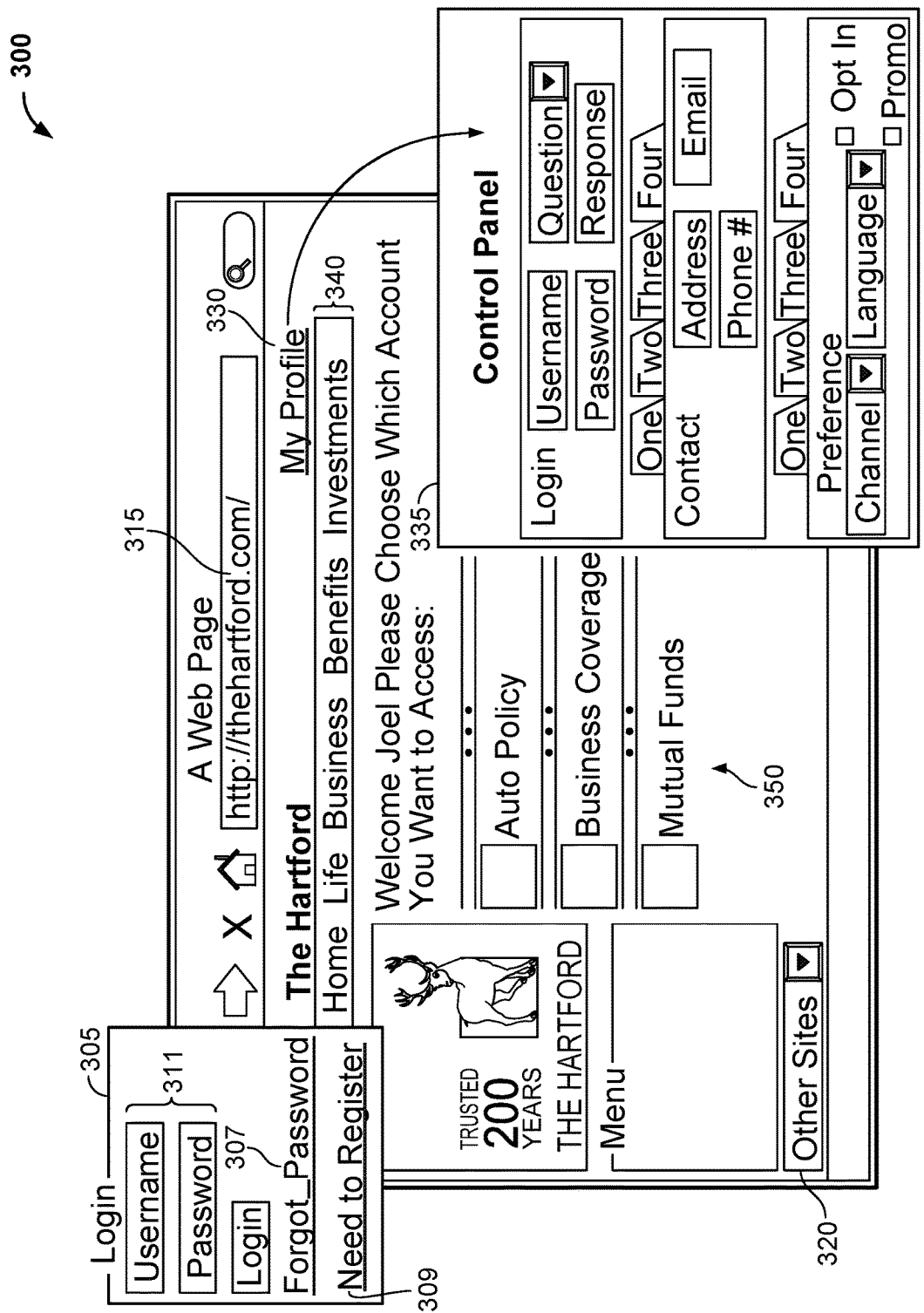
FIG. 3 is an illustration of a graphical user interface for accessing computerized insurance services through an integrated insurance portal according to an illustrative embodiment of the invention.

FIG. 3 is an illustration of a graphical user interface 300 for accessing computerized insurance services through an integrated insurance portal. The graphical user interface 300 is used by current and prospective customers of the insurance company to interact with computerized insurance services 102. The graphical user interface may be presented to users on a display of a suitable display device, e.g., on the display of user computing device 130 or user computing device 132. The graphical user interface 300 is accessible from personal computing devices, including desktop computers, laptop computers, netbooks, tablet computers, and smartphones. In some embodiments, the web application can be a stand alone application (i.e., an "app") for a smartphone or tablet computer. Alternatively, the web application may be provided substantially in real-time by front-end computing system 109 to an accessing device. In some embodiments, the particular layout and configuration of the graphical user interface 300 changes based on properties of an accessing device. For example, layout dimensions and functionality may vary based on an operating system or model type associated with the accessing device.

In some embodiments, a user must supply one or more previously established security credentials to access personal information from the graphical user interface 300. Specifically, a user accesses the graphical user interface 300 by entering a website address into address bar 315 of a web browser to be presented with a generic version of the graphical user interface 300 that includes box 305, but not any personal information. A personalized version of the graphical user interface 300 is displayed after the user provides a user identity and correctly supplies one or more security credentials.

In some embodiments, a user enters a username and password to login, as illustrated by dialog box 311 of FIG. 3. In some embodiments, a user may enter a user name and then be presented with the option to enter some or all of a set of previously established security credentials, which may include a password, to login. In some embodiments, the front-end computing system 109 selects a subset of previously established security credentials and queries the user to enter information related to the selected security credentials. For example, a user may login by entering a user identity and an access code obtained from a RSA dongle provided to the user by the insurance company per a previously completed self-registration process. A user's subsequent access to particular features of the integrated insurance system 108 may be limited or restricted based on the method used to login as well as on a stored authentication score of the user, as will be explained in the subsequent disclosure.

The graphical user interface 300 provides a single integrated insurance portal that a user may use to access any of the computerized insurance services 102. However, in some embodiments, a user may login directly to an individual one of the computerized insurance services (e.g., through a legacy Internet address) and be redirected, either automatically or after agreement, to the graphical user interface 300. Once redirected, the user may be prompted to enter login credentials in box 305 or convert existing login credentials for the individual one of the computerized insurance services into a global user identity. This would be the case if an insurance company is gradually transitioning from a network architecture in which users directly access each of the computerized insurance services 102 to a system where access to computerized insurance service 102 is arbitrated through a global portal module. A user may navigate to other websites using drop-down menu 320. For example, a user may connect directly to a website for one of the computerized insurance services 102 by selecting the service from the drop-down menu 320. In some embodiments, once a user identity is accepted by the graphical user interface 300, a user can access multiple computerized insurance services from the computerized insurance services 102 without being required to login again.

In some embodiments, an user's historical (i.e., "legacy") accounts with some or all of the computerized insurance services 102 are not fully compliant with a global user identity requirement and so existing users of the integrated insurance system 108 are required to undergo a self-registration process for a global user identity. A prospective or current customer who has not yet successfully registered for a global user identity for the integrated insurance system 108 can initiate a first-time self-registration process by selecting link 309. A user who has forgotten their username or login credentials can select link 307 to initiate a process to recover the missing information.

Display area 350 provides a unified view of insurance products associated with a given customer. For example, in the example of FIG. 3, a customer, Joel, has an auto policy, business policy, and at least one wealth management account (e.g., a mutual fund investment account, a 401(k) retirement account, and/or an annuity investment account) with the Hartford insurance company, and links to these services are provided in the display area 350. As will be explained further in this disclosure, the services displayed in display area 350 may depend not just on a user identity used to login but also on a currently active "role" for the user identity. For example, the insurance services displayed in display area 350 may vary depending on whether a user logs in a "customer," "employee," or "beneficiary" role. Although the display area is pre-populated with only some insurance services, a user may access a wider range of the computerized insurance services 102 using menu 340. For example, a user may access services from the computerized insurance services 102 organized by "home," "life," "business," "benefits," and "investments" categories.

In addition to accessing individual computerized insurance services from graphical user interface 300, a user may also access a My Profile portion of the graphical user interface 300 by selecting link 330 to display panel 335. From the display panel 335, a user may modify contact preferences, role information, opt in or out of various services, change language preferences, and perform a variety of other tasks which are described elsewhere in this disclosure. A user may also edit security settings from the display panel 335. For example, a user may perform procedures to temporarily or permanently step-up an authentication score so as to increase access rights for additional features of some or all of the computerized insurance services 102. In some embodiments, a user may set one or more security questions as depicted in the display panel 335.

In some embodiments, a user may set contact preferences directly from the display panel 335. For example, the display panel 335 shows that contact information may be set for each of four different tabs. The four tabs may correspond to different roles that Joel uses to access the front-end computing system 109. For example, the tab labeled "one" may correspond to a "customer" role, the tab labeled "two" may correspond to a "business" role, the tab labeled "three" may correspond to a "beneficiary" role, and the tab labeled "four" may correspond to a "claimant" role. Thus, Joel enters default contact information for each of these roles using the corresponding tab in the display panel 335. In some embodiments, the tabs index computerized insurances services rather than roles. Suppose Joel is registered for three computerized insurance services: auto insurance, business insurance, and mutual funds, as illustrated in FIG. 3. Then, in some embodiments, only three tabs are displayed in the "Contact" section of the display panel 335, and Joel enters default contact information for each of these three computerized insurance services using the corresponding tab.

In some embodiments, an access request to modify information via the My Profile utility 519 is permitted only if an authentication score associated with a currently active user identity and role exceeds a threshold value retrieved from the security module. Similarly, a user request to change the active role for a user identity may only be permitted if the authentication score associated with a currently active user identity and role exceeds a threshold value, which may depend on the current and/or desired role, that is retrieved from the security module described in relation to FIG. 1. If these conditions are not satisfied, the user may be prompted to permanently or temporarily increase the authentication score according to techniques described elsewhere in this disclosure.

The information provided in the graphical user interface 300 may be obtained by querying the individual computerized insurance services 102. For example, the front-end computing service may automatically query the individual computerized insurance services 102 to collect this information. Additionally or alternatively, the individual computerized insurance services 102 may send data to the front-end computing system 109 that provides this information without being queried. Further, the individual computerized insurance services 102 may send instructions to directly display information on the graphical user interface 300 or the front-end computing system 109 may generate these instructions from more general data received from the computerized insurance services. Instructions may be translated between the individual computerized insurance services and the front-end computing system 300 using an API.

Figure 4:
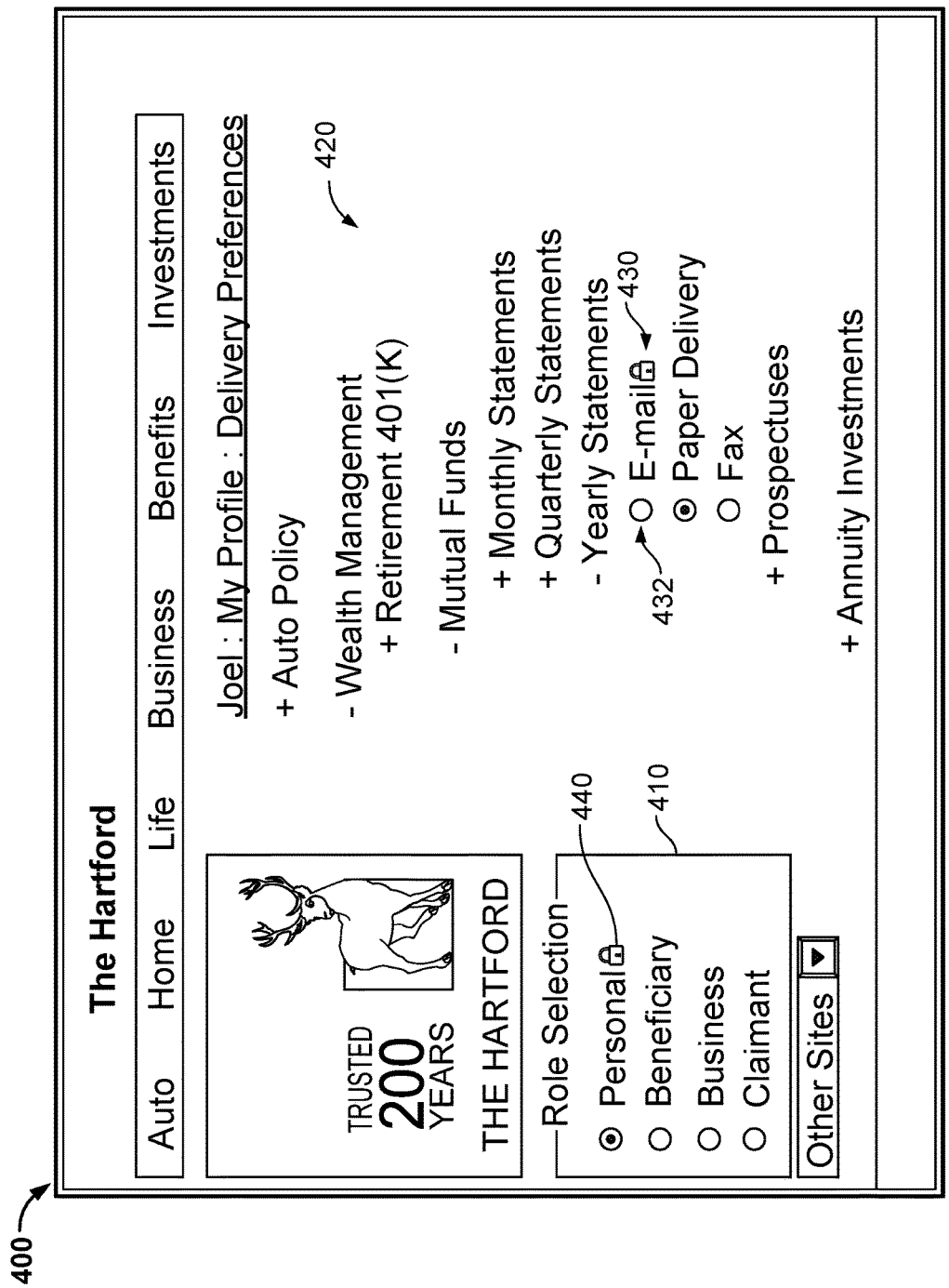
FIG. 4 is an illustration of a graphical user interface for securely setting and modifying document delivery preferences according to an illustrative embodiment of the invention.

FIG. 4 is an illustration of a graphical user interface for securely setting and modifying document delivery preferences according to an illustrative embodiment of the invention. In some embodiments, a user accesses graphical user interface 400 by selecting the My Profile link 330 from the graphical user interface 300 and selecting a "document delivery preferences" option (not shown) from the display panel 335. As illustrated in FIG. 4, a user may set and/or modify document delivery preferences globally, i.e., across all of computerized insurance services 102, from the graphical user interface 400. As further illustrated, a user may also customize document delivery preferences according to the specific document types associated with each of the computerized insurance services 102 and the user's various roles with the front-end computing system 109.

A user of the front-end computing system 109 selects a role from role selection panel 410 to customize document delivery preferences for that role. In the illustrated example, Joel has established "personal," "beneficiary," "business," and "claimant" roles with the front end computing system 109. Thus, the role selection panel 410 is pre-populated with each of these roles. As illustrated, Joel has selected to set and/or modify document delivery preferences associated with his personal role, and hence, the radio button for this role is selected (i.e., "filled in") in the role selection panel 410. Alternatively, Joel's personal role may be preselected, without direct input from Joel, if this was Joel's active role when Joel last accessed the graphical user interface 400.

In the illustrative example of FIG. 4, Joel's personal role is associated with four of the computerized insurance services 102, i.e., an auto insurance service, a retirement 401(k) service, a mutual fund service, and an annuity investment service. The front-end computing system 109 automatically organizes the retirement 401(k) service, the mutual fund service, and the annuity investment service under the title of "wealth management" in display area 420. Alternatively, in some embodiments, one of the computerized insurance services 102 is a general wealth management service that includes a retirement 401(k) service, a mutual fund service, and an annuity investment service as component services. In either case, display area 420 provides "Auto Policy" and "Wealth Management" headings based on the services associated with Joel's "personal" role. As illustrated, Joel may set document delivery preferences based on a tree-like selection structure, where selecting "+"expands document delivery preferences and selecting "-" collapses document delivery preferences. As illustrated, Joel has elected to set or modify document delivery preferences for a mutual fund computerized insurance service from the computerized insurance services 102. In the example, Joel is able to set document delivery preferences for monthly statements, quarterly statements, year-end ("yearly") statements, and prospectuses. As illustrated, Joel has selected to receive yearly statements by paper delivery. However, Joel also has the option to select to receive yearly statements by e-mail or fax, as well as by any other suitable document delivery method (though these additional delivery methods are not explicitly shown in FIG. 4).

In general, the document types (monthly statements, quarterly statements, year-end statements, and prospectuses in FIG. 4) and delivery options (e-mail, paper delivery, and fax in FIG. 4) displayed in display area 420 depend on the particular computerized insurance service and the role for which delivery preferences are being set. For example, an auto insurance policy service may include document types of "policy renewal documents" and "insurance claim status reports," which are not typically documents associated with a mutual fund service. As another example, a retirement 401(k) policy may allow e-mail and paper delivery, but not fax delivery, of some or all documents types based on security considerations. As another example, a retirement 401(k) service may allow delivery of prospectuses, but not monthly or quarterly statements, to users who access the retirement 401(k) service through a beneficiary role. Thus, options for monthly or quarterly statements would not appear in the display area 420 for these users. On the other hand, users who are affiliated with the retirement 401(k) service through a personal role may be allowed to select delivery options for each of monthly statements, quarterly statements, and prospectuses.

The document types and delivery options may further depend on a security level (e.g., an authentication score) associated with a user of the graphical user interface 400. For example, if a user's authentication score is sufficiently low, e-mail delivery of a particular document type may not be possible for the user. In some embodiments, the user may be given the option to increase his or her security credentials (e.g., the authentication score) in order to select the delivery via the desired method.

For example, padlock icon 430 indicates that, while Joel is not currently able to select e-mail delivery of yearly statements in a mutual fund service, Joel may use step-up authentication procedures to increase his authentication score so that e-mail delivery may be selected. In some embodiments, Joel would select radio button 432 and then be directed by the graphical user interface 400 to provide secure information items and/or security credentials to appropriately increase his authentication score and/or related access rights. Further, the increase in authentication score may be temporary, valid for the current activity session, or may permanently increase Joel's authentication score and/or related access rights. Similarly, Joel may be restricted from selecting document delivery preferences for certain roles without first performing authentication procedures to temporarily or permanently increase his authentication score and/or related access rights, as indicated by padlock icon 440. Temporary and permanent step-up authentication procedures are described more fully in relation to FIGS. 5-10 of this disclosure.

Figure 5:
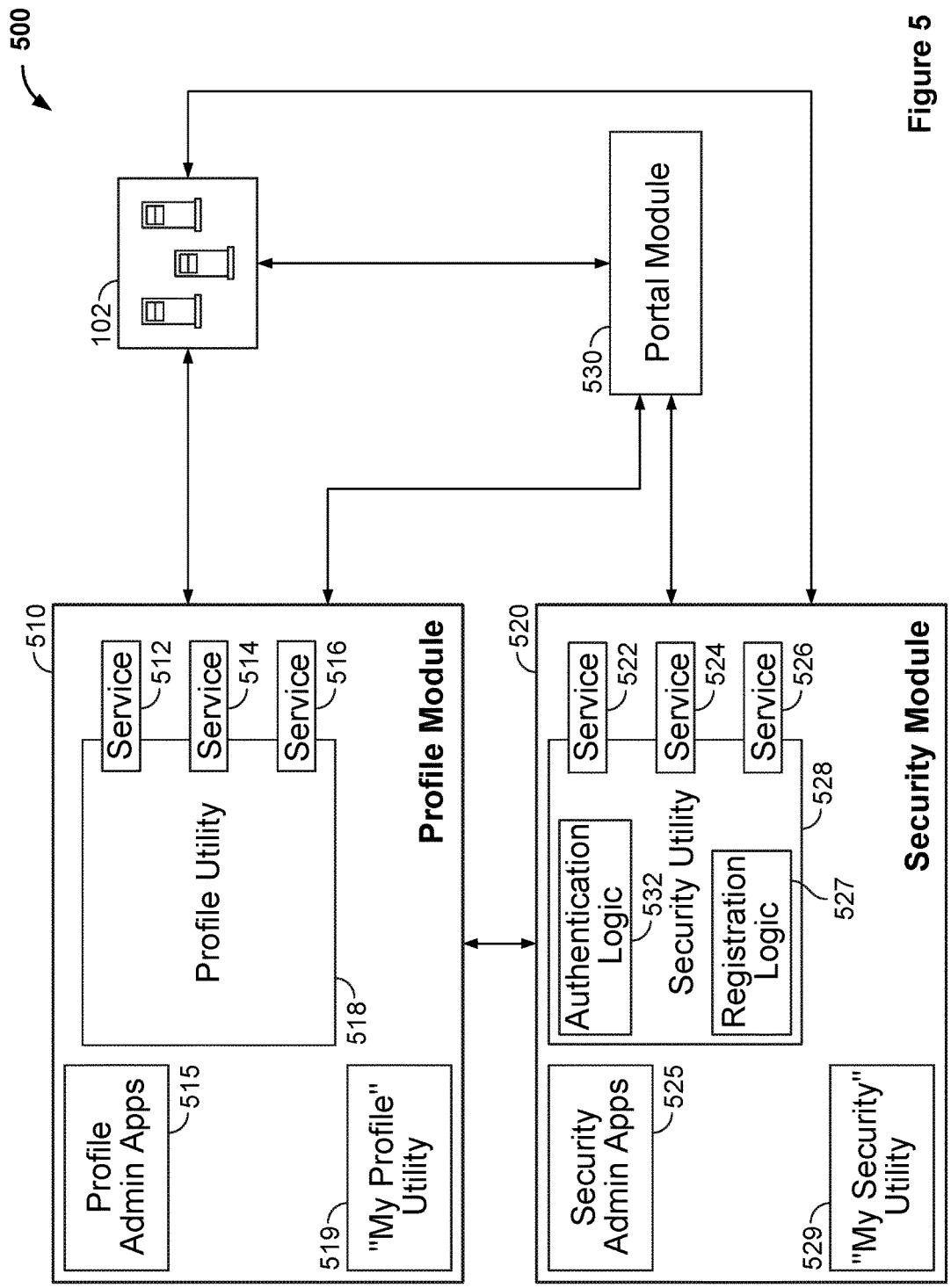
FIG. 5 is an architectural diagram of an implementation of the integrated system servers depicted in FIG. 1 according to an illustrative embodiment of the invention.

FIG. 5 is an architectural diagram of an implementation 500 of the integrated system servers 112 depicted in FIG. 1 according to an illustrative embodiment of the invention. As illustrated in FIG. 5, the implementation 500 includes a profile module 510, a security module 520, and a portal module 530. Each of these modules is stored in memory of the integrated insurance system 108 in the form of computer executable instructions and is executed by one or more processors of the integrated insurance system 108. In some embodiments, software code for each of these modules is stored in memory of the integrated system servers 114 and is executed using one or more processors of the integrated system servers 114. Alternatively, the software code for some or all of the modules may be stored in locations internal or external to the front-end computing system 109 and may be executed using other processing resources, e.g., the processing unit 120.

As illustrated in FIG. 5, the profile module 510, security module 520, and portal module 530 are all communicatively coupled to each other and also to the computerized insurance services 102. Further, each of these modules is communicatively coupled to the network interface 114. The portal module provides instructions for the display of graphical user interface 300 to a user of the front-end computing system 109. Additionally, these instructions may be sent directly from one of the individual computerized insurance services 102. A user's selections on the graphical user interface 300 are routed by the portal module 530 to the computerized insurance services 102, the profile module 510, or the security module 520 as appropriate.

Each global user identity registered with the integrated insurance system 108 is associated with one or more roles. A role describes the nature of the user's interactions with the front-end computing system 109 in a certain capacity, which may be personal or professional. As an illustrative example, consider a customer of the insurance company named Joel Smith who owns a small business which is covered by a business insurance policy, has a personal health insurance policy in which a claim was recently filed, and is designated as the beneficiary on another party's life insurance policy with the insurance company. Suppose further that Joel is registered with the front-end computing system 109 using a global user-identity of JoelSmith12345. The user identity JoelSmith12345 would be associated with at least the following roles:

"policy holder"—corresponding to Joel's personal health insurance policy and business insurance policy;

"beneficiary"—corresponding to the life insurance policy on which Joel has been designated a beneficiary;

"business owner"—corresponding to Joel's business insurance policy; and

"claimant"—corresponding to Joel's personal health insurance policy.

Some of these roles are long-term in nature (e.g., business owner) while others are short-term (e.g., claimant). Some roles are based on Joel as an individual while others relate to Joel's business. In general, a role corresponds to one or more insurance policies with which a user is affiliated.

Role information is used to customize presentation and security features of the front-end computing system. For example, when Joel logs in under his policy holder role, a link to both a health insurance service and a business insurance service from the computerized insurance services 102 will be displayed in the display area 350 (additionally, information from the specific policies of these services that relate to Joel may be displayed in the graphical user interface 300). When Joel logs in under the claimant role, a link to the current status of his personal health insurance claim may be displayed in the display area 350. Importantly, as will be described further, each user identity and role is associated with an authentication score. The authentication score is used to selectively grant access to certain features of the computerized insurance services 102.

The profile module 510 stores or else maintains pointers to information for each user identity that is registered, or that has attempted to be registered, with the front-end computing system 109. This information includes, for each user identity and role (if multiple roles are associated with a given user identity):

contact information (name, address, phone number, e-mail);
an authentication score;
notifications and alerts;
communications preferences (e-delivery, mail);
display settings;
consent for information sharing;
beneficiary information;
default language;
terms and conditions signed and to be signed;
default device options and layouts for graphical interfaces; and
past transaction history (including history of failed login attempts and IP addresses used).

Further, each user identity is associated with a default role. For example, if Joel Smith has selected "claimant" as his default role, then when Joel Smith logs in to front-end computing system 100, he is presented with options customized according to the "claimant" role. A user may change the role associated with a given activity session.

A non-exhaustive list of roles associated with the front-end computing system 109 includes: agent, applicant, assignee, auditor, beneficiary, biller, broker, buyer, carrier, claim expert, claimant, claimee, coinsurer, contractor, credit specialist, customer, employee, insured, legal advisor, paying agent, policy holder, reinsurer, requester, retiree, supplier, investor, and underwriter.

In some embodiments, the agent role is used by an agent of the insurance company to access information related to customer accounts served by the agent on behalf of the insurance company. For example, an agent of the insurance company may represent dozens or hundreds of customers of the insurance company. When the agent logs into the front-end computing system 109 under the agent role, the agent may be able to access policy information for these customers (e.g., in response to a customer request to do so). In some embodiments, the agent's access under the agent role is restricted only to those types of policies and/or services that the agent directly services (e.g., if the agent works only in auto insurance sales and service, then the agent would only have access to the auto insurance component of customer policies). In other embodiments, the agent is granted access to information for the other computerized insurance services that agent's customers use. The agent may use this additional information to identify opportunities to add, remove, or otherwise modify the insurance services used by a customer. The agent may then recommend insurance coverage changes to the customer based on this additional information. In some embodiments, an agent is only granted access to customer accounts after explicit approval is granted by the customer.

The profile module 510 includes a profile utility 518, which includes a number of support services, including support services 512, 514, and 516 (as well as other support services not explicitly illustrated in FIG. 5). The support services interact with the other components of the integrated insurance system 108 to provide a uniform experience to users. In some embodiments, the services 512, 514, and 516 include one or more of a data pre-populate service, a data verification service, a merge and link service, a role management service, and a data update service.

The data pre-populate service of profile utility 518 can be called by one of the computerized insurance services 102 as a request for information stored in connection with the portal module 530. For example, one of the computerized insurance services 102 may pre-populate a new account form based on global contact information (name, address, phone number, and/or e-mail) retrieved from the profile module 510. In another example, web pages and forms presented to a user of one of the computerized insurance services 102 may be pre-populated based on a default language preference (e.g., English) associated with a current user identity and role that is obtained by calling the role management service of the profile utility 510.

The data verification service of profile utility 518 can be called by one of the computerized insurance services 102 as a request for authentication information, past transaction history, or other information related to verifying a user identity or an authentication score associated with a user identity. As an illustrative example, a user may attempt to access a restricted service, such as a beneficiary designation form, while using a wealth management service included as one of the computerized insurance services 102. In this case, the wealth management service investment service may make a request to the data verification service of profile utility 518 in two ways. First, when a user first attempts to login to the wealth management service, the wealth management service sends a query to the data verification service of profile utility 518 to determine whether an authentication score of the user, under the role, is greater than a first threshold value. Second, when a user attempts to use the wealth management service to change the beneficiary form, the wealth management service sends another query to data verification service of profile utility 518 to determine whether the authentication score of the user, also under the current role, is greater than a second, greater, threshold value.

The data update service of profile utility 518 can be called by one of the computerized insurance services 102, by security module 520, by portal module 530 or by other components of the integrated insurance system 108 to provide updates to stored user profile information including updates to a transaction history associated with a user identity. As an illustrative example, a user may change a phone number on a beneficiary form in one of the computerized insurance services (e.g., to be different than pre-populated information). In this case, the computerized insurance service would send a data update request to the profile utility 510 to update the phone number so that the updated number is available globally throughout the computerized insurance services 102. Before doing so, a user may be prompted to indicate whether they want the change to apply globally or just within the active computerized insurance service.

The merge and link service of profile utility 518 can be called by one of the computerized insurance services 102, by security module 520, by portal module 530, or by other components of the integrated insurance system 108. The merge and link service is responsible for merging and linking legacy accounts (i.e., accounts previously created for individual ones of the computerized insurance services 102). In some embodiments, a user's legacy accounts are identified by profile utility 518, merged (if the legacy accounts are substantially compatible) or linked (if the legacy accounts are not substantially compatible). In some embodiments, the merging and/or linking is performed upon initial self-registration and the merged and/or linked accounts are then used to create a single global user identity for use with the integrated insurance system 108. During the merging process, a user may be prompted to resolve conflicting data from the to-be-merged accounts (e.g., conflicting address information).

The role management service of profile utility 518 can be called by one of the computerized insurance services 102, by security module 520, by portal module 530, or by other components of the integrated insurance system 108. The service permits a user to add and remove roles associated with a given user identity.

The profile module 510 includes a My Profile utility 519. The My Profile utility 519 is responsible for handling updates and modifications to user profile information when a user directly changes profile information via link 330 on graphical user interface 300.

The profile module 510 includes a profile administrative applications utility 515. The profile administrative applications utility 515 allows an external user to call applications to view, modify, and/or export stored profile information. For example, an employee of the insurance company may invoke the profile administrative applications utility 515 using one of the company terminals 122. Similarly, manual adjustments to the information stored through the profile module 510 can be made by executing the applications of the profile administrative applications utility 515.

The security module 520 includes a security utility 529, which includes a number of support services, including support services 522, 524, and 526 (as well as other support services not explicitly illustrated in FIG. 5). The support services interact with the other components of the integrated insurance system 108 to globally manage security aspects of user self-registration, authentication, and authorization. In some embodiments, the services 522, 524, and 526 include one or more of an information collection service, a data verification service, an authentication score management service, a credential service, and an authentication service.

The information collection service of the security utility 518 can be called by one of the computerized insurance services 102, the portal module 530, the profile module 510, or some other component of the integrated insurance system 108. The information collection service obtains information about a user identity necessary to make a decision as to whether to issue one or more security credentials to the user. This information may be obtained by calling the profile module 510, by generating queries to a user for information, or by accessing information from the external databases 121 or the internal information repository 104 and prompting the user for some of the accessed information. The information can also be obtained from other sources, such as information provided by a user to a representative of the insurance company, information mailed to the insurance company by the user, or information submitted to the insurance company by a third party provider based on an in-person visit of the user to the third party provider (e.g., results of drug and substance tests).

The data verification service of the security utility 518 can be called by one of the computerized insurance services 102, the portal module 530, the profile module 510 or other component of the integrated insurance system 108. The data verification service compares information received from the user using the information collection service to objective measures of performance and/or to data received from trusted sources. As an illustrative example, a substance and drug test result submitted by a user via the information collection service may be compared to predefined tables to determine whether the test is a "pass" by the standards of the insurance company. Non-binary measures may also be used to assess the performance of the test. As another example, financial record information provided by a user may be compared to public records available in one of the external databases 121 to corroborate the provided information. In some embodiments, the data verification service provides a verification score which indicates the degree to which the user has been verified. The verification score may be a number (e.g., between 1 and 100) and may depend both on the amount of information requested by the information collection service and the results of the data verification process.

The credential service of the security utility 518 establishes one or more security credentials for a user based on the verification score. In some embodiments, no credentials are issued unless the verification score is above a threshold. The one or more security credentials may be issued by the insurance company (e.g., a secure RSA token code), supplied by the user (e.g., a password), or a combination thereof. In some embodiments, the user may select from different types of possible security credentials and establish the selected types of security credentials. Once established, the one or more credentials are recorded by the security module 520 for future reference.

The authentication score management service of the security utility 518 establishes and updates an authentication score for each user identity and role registered with front-end computing system 109. The authentication score management service first determines an initial authentication score based on the verification score. In some embodiments, the initial authentication score is equal to the data verification score. Further, the authentication score management service updates the score based on user activity, for example, failed and successful login attempts, and provides the authentication score to requesting services. Further, the authentication score management services initiates activities that allow a user to temporarily or permanently increase the authentication score associated with a user identity and/or role.

As an illustrative example, a user may request to access a feature of a given one of the computerized insurance services for which the user does not have a high enough authentication score. In this case, the computerized insurance service may call the authentication score management service of the security module 520. Alternatively, the security module 520 may monitor user interactions with the computerized insurance service and initiate a call of the authentication score management service on its own. In either case, the authentication score management service may proceed by retrieving the relevant authentication score from the profile module 510 based on a currently active user identity and role, comparing it to a required authentication score threshold, and providing a value of a required increase in the authentication score to the information collection service of the security module 520. The information collection service, the data verification service, and the credential service may execute as described above in order to establish an authentication score for the user that will be sufficient for the user to access the desired feature.

The authentication service of the security utility 518 authenticates a user by prompting the user for one or more previously established security credentials and "authenticating" the user if correct (or sufficiently correct) responses are supplied in response to the prompts.

The security module 520 includes a My Security utility 529. The My Security utility 529 is responsible for handling security-related updates and modifications that may be requested directly by a user via the graphical user interface 300. A user may access the My Security utility from the display panel 335 described in FIG. 3. In some embodiments (not explicitly shown in FIG. 3), a separate My Security link is presented on graphical user interface 300, and a user may click on the link to display a panel similar in design to the display panel 335, but displaying primarily security-related options.

The security module 520 includes a security administrative applications utility 525. The security administrative applications utility 525 allows an external user to call applications to view, modify, and/or export stored registration and authentication information. For example, an employee of the insurance company may invoke the security administrative applications utility 525 using one of the company terminals 122. Similarly, manual adjustments to the information stored through the security module 520 can be made.

As illustrated in FIG. 5, the security utility 528 includes registration logic 527 and authentication logic 532. The registration logic 527 includes specialized software and/or hardware components configured to allow users to self-register for a global account for use with the front-end computing system 109. Similarly, the authentication logic 532 includes specialized software and/or hardware components configured to authenticate and grant access rights to users of the front-end computing system 109. The registration logic 527 and authentication logic 532 are each used to invoke appropriate support services of the security module. In some embodiments, the registration logic 527 executes some or all of the self-registration computing steps described in relation to FIGS. 6 and 7, while the authentication logic 527 is used to execute some or all of the authentication and authorization computing steps described in relation to FIGS. 8 and 9.

Figure 6:
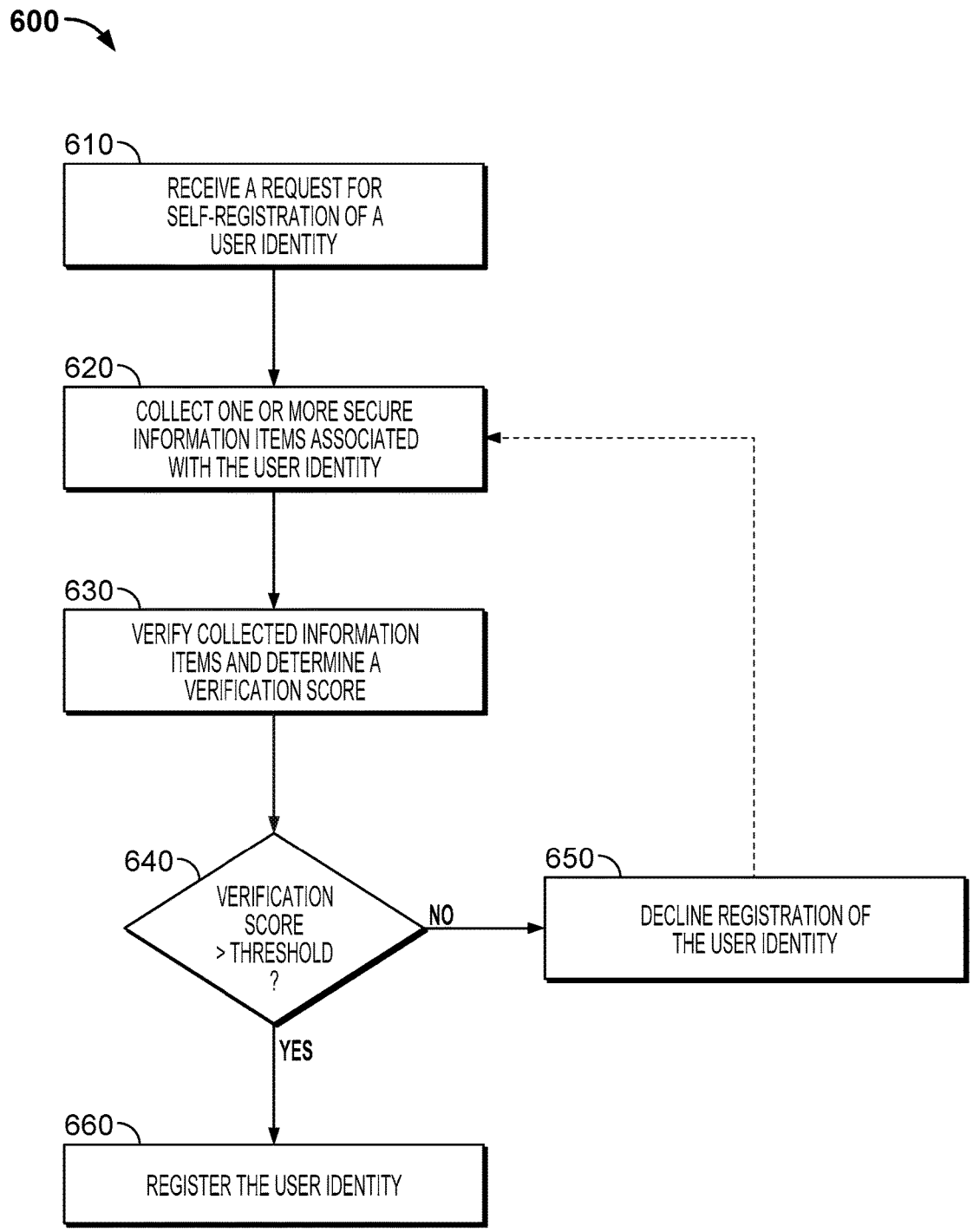
FIG. 6 is a flowchart of a method for the self-registration of a user of an integrated insurance system according to an illustrative embodiment of the invention.

FIG. 6 is a flowchart of a method 600 for the self-registration of a user of the integrated insurance system 108 according to an illustrative embodiment of the invention. The method 600 comprises receiving a request for self-registration of a user identity (step 610), collecting one or more secure information items associated with the user identity (step 620), invoking a data verification service to verify data and determine a verification score (step 630), comparing the verification score to a threshold (step 640), registering the user identity if the verification score exceeds a threshold (step 660), and declining to register the user identity if the verification score does not exceed the threshold (step 650).

The front-end computing system 109 receives a request for self-registration of a user identity (step 610). The self-registration request may be initiated directly by a user who selects the self-registration link 309 of the graphical user interface 300. In this case, the self-registration request is sent from the portal module 530 to the security utility 528. Additionally, the self-registration request may be initiated automatically by one of the computerized insurance services 102 after a user logs in directly to one of the individual computerized insurance services 102 (e.g., during a period in which an insurance company is transitioning existing user accounts for the individual computerized insurance services 102 into a single global account for the front-end computing system 109). In this case, the self-registration request is sent from the individual computerized insurance service 102 to the security utility 528. Upon receiving the self-registration request, the security utility 528 invokes registration logic 527 to execute one or more of the support services of the security module 520 to perform self-registration.

The security utility 528 invokes the information collection service of the security module 520 to collect one or more secure information items associated with the user identity (step 620). The security module 520 uses the collected secure information items to verify that a user is who he/she claims to be at the time that self-registration is requested. To collect the secure information items, the information collection service queries the user for identifying information. To do so, the information collection service may generate queries by pooling information from the internal information repository 104, the external databases 121, the information stored by the user profile module 510, and/or information obtained in connection with legacy accounts registered with the computerized insurance services 102. Additionally, the information collection service may request information from a user that requires the user to provide identification and verification information (e.g., biometric information) to a representative of the insurance company over the telephone, by visiting a local branch of the insurance company or a third-party site, and/or by mailing materials to the insurance company.

The security utility 528 invokes the data verification service to verify data and determine a verification score (step 630). The data verification is determined by comparing user supplied answers (from step 620) with expected answers (where applicable) and/or predefined response ranges (where applicable). In some embodiments, each user answer is assigned a numerical value, and the user's verification score is equal to the sum value of the numerical values associated with the user's answers. The security utility 528 also invokes the data verification service to compare the verification score with a threshold value needed to self-register the requested user identity.

If the verification score exceeds the threshold value (determined at step 640), the user identity is registered (step 660). A method for registering a user is explained in greater detail in relation to FIG. 7. On the other hand, if the verification score does not exceed the threshold value (determined at step 640), the front-end computing system 109 declines to register the user identity. In certain embodiments, the registration logic 527 returns to collect additional information about the user (at step 620). In certain embodiments, the declination places a block on registry of the user identity until further action is taken (e.g., a customer calls the insurance company). Even if a user identity is declined for registration (at step 650), information about the user identity is stored in the profile module 510. For example, the specific user interactions that resulted in declining registration are stored.

Figure 7:
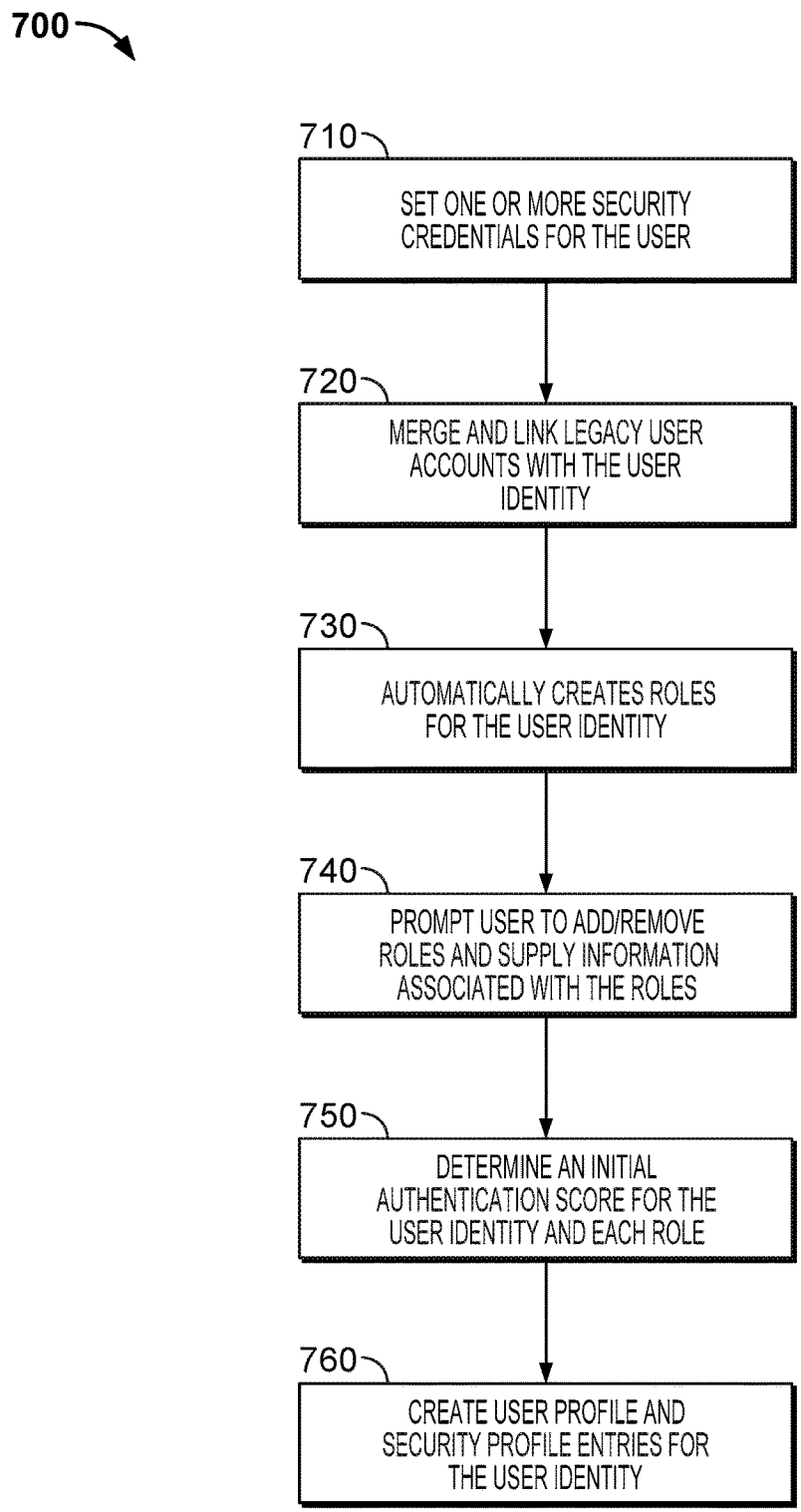
FIG. 7 is a flowchart of a method showing further details for the self-registration of a user of an integrated insurance system according to an illustrative embodiment of the invention.

FIG. 7 is a flowchart of a method 700 showing further details for the self-registration of a user of the integrated insurance system 108 according to an illustrative embodiment of the invention. The method 700 corresponds to a more detailed illustration of registering a user identity (step 660) of FIG. 6 in accordance with embodiments. The method 700 comprises setting one or more security credentials for a user identity (step 710), merging any legacy user accounts (step 720), automatically creating roles for the user identity (step 730), prompting the user to add and/or remove roles (step 740), determining an initial authentication score for the user identity (step 750), storing the registered user identity and authentication score for each role (step 750), and creating a user profile and security profile entry for each user identity (step 760).

The security utility 528 invokes the credential service of the security module 520 to set or establish one or more security credentials for the user (step 710). The security credentials may include biometric identifiers, passwords, RSA tokens, security images, and other credentials. In some embodiments, the user can choose certain security credentials from a plurality of possible security credentials. Further, some of the set security credentials (step 710) may correspond to information provided during data collection (step 620). For example, a user may have supplied a fingerprint identifier during an in-person visit to a local branch of the insurance company (step 620), and this fingerprint identifier may be set as a security credential (step 710). In addition to setting security credentials (step 710), the credential service also supplies the user with the information needed to provide the security credentials in subsequent sessions with the front-end computing system 109. For example, instructions may be sent to mail to the user an RSA key generator and/or a fingerprint scanner. Information on established credentials may also be presented to the user on a screen.

In some embodiments, one or more security credentials may be set or established (at step 710) by importing security credentials previously established by the user with respect to other trusted services maintained by the insurance company. For example, in some embodiments, security credentials previously established with respect to individual ones of the computerized insurance services 102 are imported (at step 710) and this saves the user the time and inconvenience of having to establish some or all of the security credentials normally required during registration with the front-end computing system 109 (at step 710). In some embodiments, security credentials are imported from trusted third-party services, i.e., that are not maintained or owned by the insurance company. Examples of trusted third-party services may include a third-party verification service, a third-party identity management service, or a trusted affiliated business. For example, a user may have already completed similar security procedures with respect to an independently owned and operated third-party brokerage website. In this case, the insurance company may have an agreement with the third-party brokerage website to allow the importation of the user's previously established security credentials during the user's registration with the front-end computing system 109 (at step 710). In some embodiments, the trusted third-party service is an identification or verification service run by a state or federal government, or a service that that collects and provides state or federal government records (e.g., Department of Motor Vehicle (DMV) records and/or passport-related records).

The profile utility 518 invokes the merge and link service to merge and/or link legacy user accounts (step 720). Specifically, the merge and link service queries some or all of the computerized insurance services 102 to determine if legacy accounts have been created corresponding to the user identity. The user may also be prompted to provide information on possible legacy accounts to the merge and link service, which then verifies this information. Once the legacy accounts have been identified they are either merged and/or linked to the newly registered global user identity. In some embodiments, legacy login information is rendered inactive once the legacy account is merged with the newly registered global user identity, and the user is forced to use the global user identity in future interactions with the integrated insurance system 108. For some legacy accounts, the legacy account is linked, rather than merged, to the newly registered global user identity. Linking of the user account to the global user identity enables much of the same functionality as account merging but leaves the linked legacy account active so that a user can still use the old account information to directly log in to the corresponding computerized insurance service.

In some embodiments, the information platform running a linked legacy account proactively generates most or all of the calls to the user profile module 510 and the security module 520 (i.e., rather than relying on queries initiated by these modules to the information platform) to provide similar or identical integrative functionality to profile and security services as available for merged legacy accounts. For example, when user logs in directly to a legacy linked account, the legacy linked account may proactively generate one or more calls to the security module 520 so that login authentication can be performed using the information established from the user's global user identity. Instructions between the legacy account and the security module 520 may be translated using an API or any other technique or system. This translation may be performed by the information platform running the legacy account, by the security module 520, or by another intermediary computing device or resource.

The profile utility 518 invokes the role management service to automatically create roles for the newly registered user identity (step 730). The automatic creation of roles is context sensitive. For example, roles may be created for some or all of the merged legacy accounts (determined at step 720) based on a type of the legacy account. A merged business insurance legacy account may result in the automatic creation of a "business owner" role and the population of the user profile information of the newly created user identity with information from the business account. Similarly, a merged health insurance account that includes a recently filed claim may result in the creation of two roles, a "policy holder" role reflecting the personal health insurance policy in general and a "claimant" role reflecting a recently submitted health insurance claim submitting for the policy.

The profile utility 518 invokes the role management service to add or remove roles from those automatically created (step 740). In addition, a user may add or change default preferences associated with each role. For example, a user may select a preferred contact method (e.g., among phone, mail, or e-mail) and default display options for the graphical user interface 300 associated with each role.

The security utility 528 invokes the authentication score management service of the security module 520 to determine an initial authentication score for each role of the user identity (step 750). The initial authentication score may be set based on the verification score (determined at step 630). Additionally or alternatively, the initial authentication score may be based on an access device used by the user, an IP address of a user device used to access the self-registration process, the one or more secure information items supplied by the user (step 620), the security credentials set and/or provided to the user (step 710), as well as other information. In some embodiments, the authentication score is a positive-valued integer, with higher values indicating higher degrees of trust that a user identity corresponds to the registered customer.

The profile utility 518 and security utility 528 create a user profile and security profile, respectively, for the user identity (step 760). The user profile and security profile store information provided and inferred about the user identity in the steps illustrated in FIGS. 5 and 6. For example, the user profile stores the user identity, roles associated with the user identity, preferences associated with the roles, the initial authentication score for each role, and logs some or all of the user interactions with the front-end computer system 109 during the self-registration process. The security profile stores information related to the one or more security credentials supplied to the user that will later be used by the user to authenticate himself or herself to the front-end computing system 109 in subsequent activity sessions.

Figure 8:
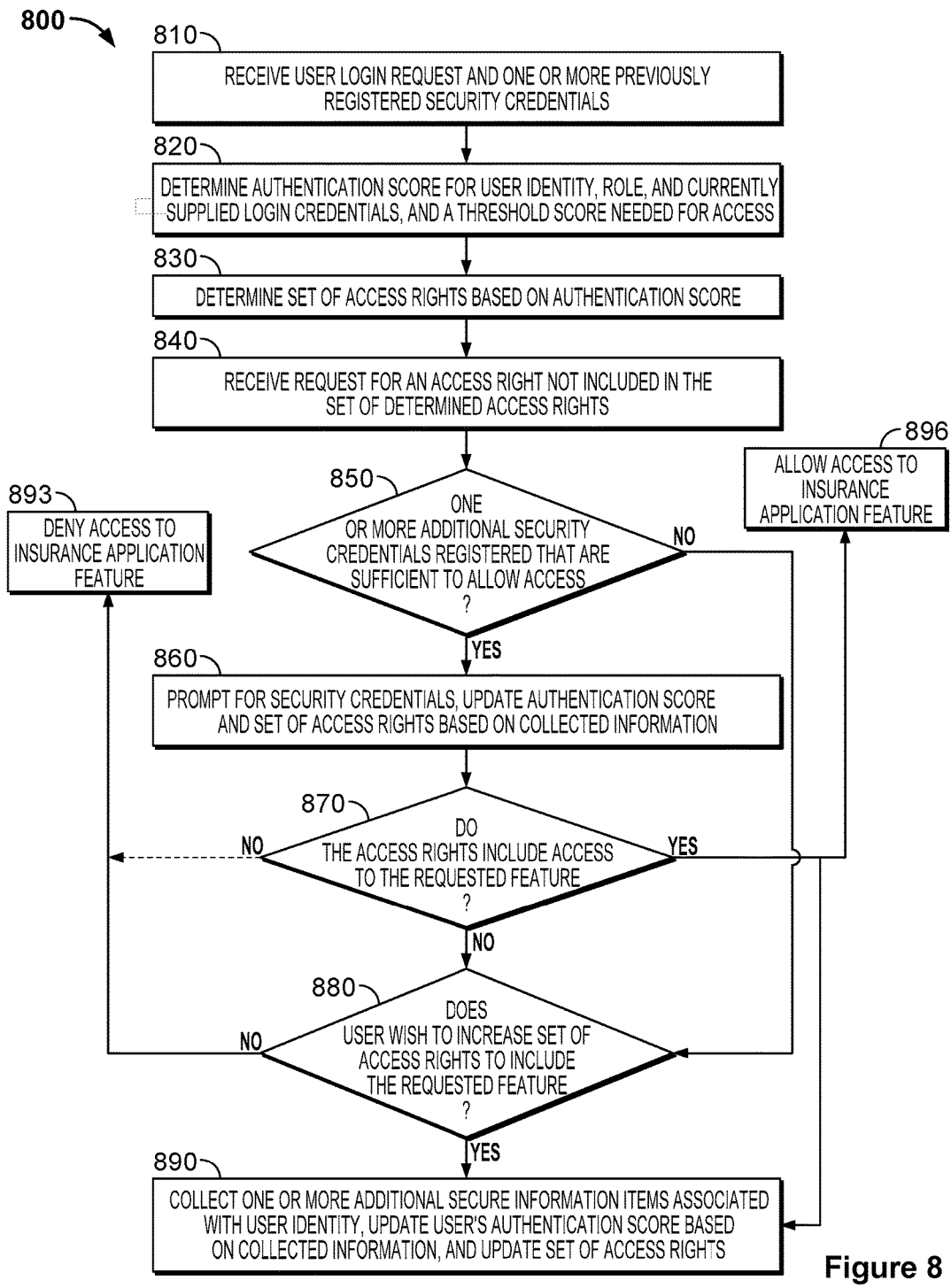
FIG. 8 is a flowchart of a method used by an integrated insurance system to selectively grant access to features of computerized insurance services based on access rights according to an illustrative embodiment of the invention.

FIG. 8 is a flowchart of a method 800 used by the integrated insurance system 108 to selectively grant access to features of the computerized insurance services 102 (FIG. 1) based on access rights according to an illustrative embodiment of the invention. The method 800 comprises receiving a user login request to one of the computerized insurance services 102 that includes a user identity and one or more previously established (i.e., registered) security credentials (step 810), determining an authentication score associated with the user identity, the user supplied security credentials, and a role (step 820), determining a set of access rights that will govern the user's interactions with the computerized insurance service (step 830), receiving a request to access a feature of the computerized insurance service that is not included in the set of access rights (step 840), determining one or more additional previously established security credentials (step 850), prompting the user to supply information on some or all of the additional one or more security credentials (step 860), determining whether the access rights include access to the requested feature (step 870), prompting the user to increase the set of access rights to include the requested feature (step 880), collecting one or more additional secure information items associated with the user identity, updating the user's authentication score, and updating the set of access rights (890), allowing access to the requested feature (step 896), and denying access to the requested feature (step 893).

The integrated insurance system 108 receives a user login request to one of the computerized insurance services 102 (step 810). The login request includes a user identity and one or more previously established security credentials associated with the user identity. The login request is received from a user interacting with one of the user computing devices 130 and 132.

Before the user is permitted to access the requested computerized insurance service, the security module 520 determines an authentication score associated with the user identity, the supplied security credentials, and a role (step 820). In some embodiments, the authentication score consists of a "base" component, retrieved from storage of the integrated insurance system 108, and a "dynamic" component, based on activities that occur during the user's current activity session. The component parts of the authentication score will be further described in the subsequent disclosure.

The security module 520 determines a set of access rights that will govern the user's interactions with the computerized insurance service (step 830). Examples of access rights will be provided in the subsequent disclosure. However, a basic access right is entry. If the entry access right is included, the user will be permitted baseline access to the selected computerized insurance service in which at least some basic features are available to the user.

The integrated insurance system 108 receives a request to access a feature of the computerized insurance service that is not included in the set of access rights (step 840). For example, a user may request to change beneficiary information associated with an annuity investment service after logging in to the service, but may have only been granted basic read (or "view") access (step 830) to the annuity investment service when the user initially logged in, which does not include a right to change potentially sensitive beneficiary information (e.g., the name of a beneficiary and/or an allocation of the account among several beneficiaries). As another example, a user may request to change the amount of coverage for her husband within a life insurance computerized service, but may have only been granted basic read access (step 830) to the life insurance service when she initially logged in.

The integrated insurance system 108 determines whether one or more additional previously established security credentials exist and, if so, whether the user's supply of the security credentials would sufficiently raise the user's authentication score so as to grant the requested access right. If such credentials are available the user is prompted to supply information on some or all of the credentials (step 860). Otherwise, the user is queried to determine if the user wishes to take additional authentication actions to increase the set of access rights to the required level to gain the desired access right (step 880).

The authentication score management service of the security module 520 determines possible combinations of the remaining one or more security credentials that, if properly answered, would allow the requested access right (step 860). The system then prompts the user to enter one of these combinations. In some embodiments, the authentication score management service of the security module 520 allows the user to choose a valid combination of the one or more additional security credentials and then prompts the user for the selected credential information. Based on the user's supplied information, the authentication score management service of the security module 520 updates the authentication score and updates the set of access rights.

For example, a user may have previously (e.g., at an earlier date) established three additional security credentials that were not provided when the user initially logged in (step 810). For example, the user may have logged in using a standard eight to ten digital password (at step 810), but may have also previously established the following three security credentials: answers to a set of security questions related to the user's personal life (e.g., a name of a middle school attended, name of a grandparent, and name of a favorite athlete), a customized pin code for an RSA code generation tool in the user's possession, and a fingerprint scan created a biometric scanner in the user's possession. In this case, the authentication score management service of the security module 520 may determine that if the user were to correctly provide at least two of the three unused security credentials (i.e., the set of security answers, the RSA code, and the fingerprint), that the user's authentication score would be sufficiently increased so that the requested access right would be included in an updated set of access rights. The security module 520 may then generate instructions for displaying a prompt to the user to select any two of the three previously established security credentials and enter the corresponding information.

The authentication service of the security module 520 determines if the requested access right is in the updated set of access rights (step 870) (this may not be the case if the user improperly supplies some of the additional security credentials). If so, the user is allowed to access the requested feature of the computerized insurance service (step 896). If not, the user is queried to determine if the user wishes to take additional authentication actions to increase the set of access rights (step 880). Alternatively, the integrated insurance system 108 may simply deny access to the requested feature (step 893).

If the user elects to increase the set of access rights (at step 880), the user is prompted for one or more additional secure information items associated with the user identity (step 890). Specifically, the security utility 528 invokes the information collection service of the security module 520 to collect one or more additional secure information items associated with the user identity. The security module 520 uses the collected secure information items to verify that a user is who they claim to be. To collect the secure information items, the information collection service queries the user for identifying information. For example, the information collection service may query the user using technique similar or identical to those described in relation to FIG. 6 (step 620).

To do so, the information collection service may generate queries by pooling information from the internal information repository 104, the external databases 121, the information stored by the user profile module 510, and/or information obtained in connection with legacy accounts registered with the computerized insurance services 102. Additionally, the information collection service may request information from a user that requires the user to provide information to a representative of the insurance company over the telephone, visit a local branch of the insurance company or a third-party site to provide identification and verification information (e.g., biometric information), or mail additional information to the insurance company. The authentication score management service of the security module 520 updates the user authentication score and updates the set of access rights associated with the updated authentication score.

The authentication service of the security module 520 determines if the requested access right is in the updated set of access rights (step 870). If so, the user is allowed to access the requested feature of the computerized insurance service (step 896). If not, the integrated insurance system 108 may simply deny access to the requested feature (step 893).

Figure 9:
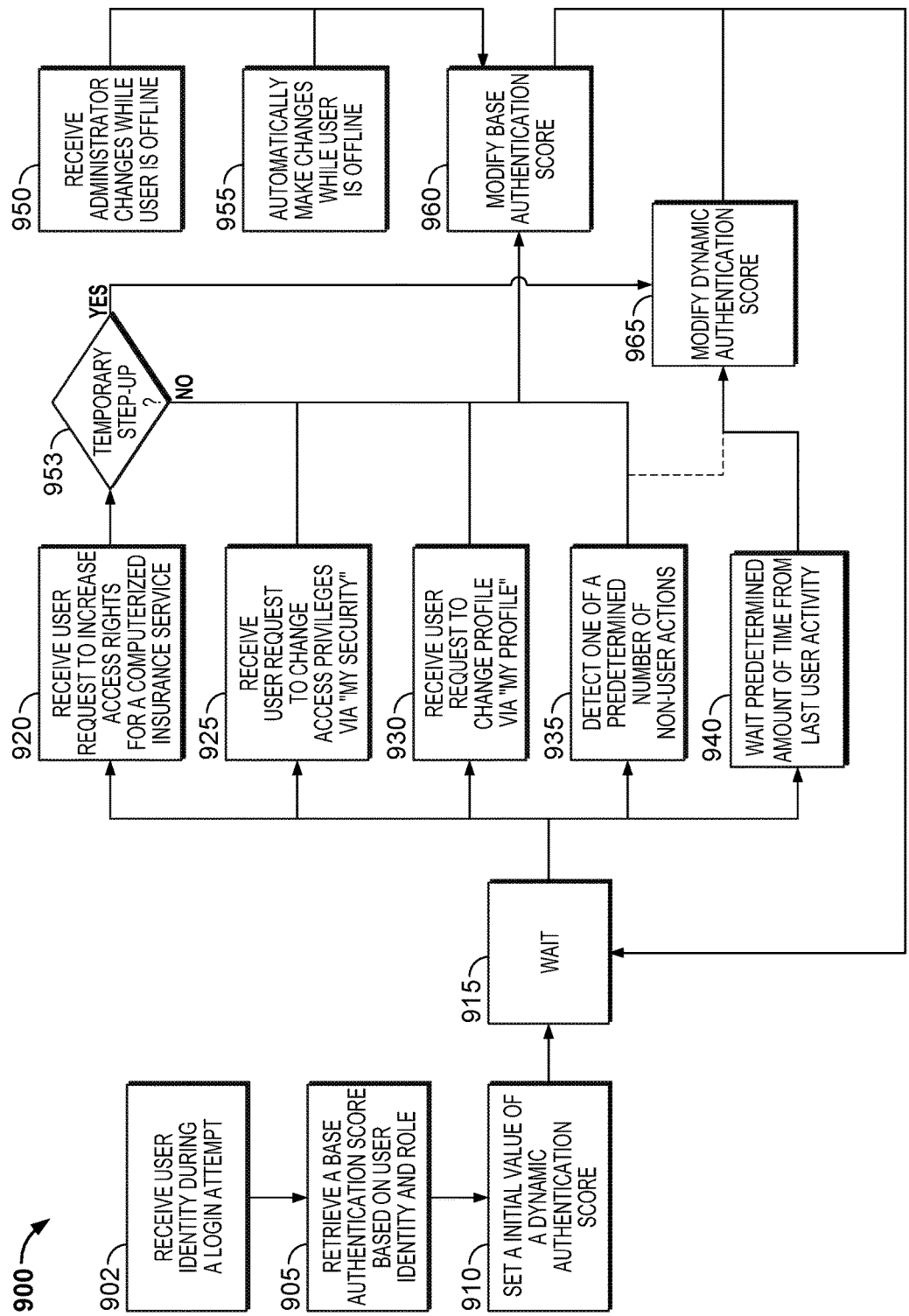
FIG. 9 is a flowchart of a method used by a security module to track an authentication score for a user identity over time based on user and non-user interactions with an integrated insurance system.

FIG. 9 is flowchart of a method 900 used by the security module 520 to track an authentication score for a user identity over time based on user and non-user interactions with the integrated insurance system 108. The method comprises receiving a user identity as a first part of an attempted user login (step 902), retrieving a base authentication score for the user identity (step 905), setting a dynamic authentication score for the user identity and a role (step 910), waiting for one of a predetermined number of events to occur (step 915), where the predetermined events include a user request to increase a set of access rights for a given computerized insurance product (step 920), receiving a user request to settings via the My Security utility (step 925), receiving a user request to change settings via the My Profile utility (step 930), detecting a non-user action (step 935), and waiting a predetermined amount of time since a user activity (step 940). The method further comprises determining if the request for access rights is for a temporary increase in the access rights (step 953), modifying a base authentication score (step 960), and modifying a dynamic authentication score (step 965). The method further comprises receiving administrative changes while a user is offline (step 950) and automatically making changes to an authentication score while a user is offline (step 955).

The method is executed when the integrated insurance system 108 receives a user identity as a first part of an attempted user login (step 902). Upon receiving a user identity, and before corresponding login security credentials are supplied, the security module 520 calls the profile module 510 to retrieve a base authentication score for the user identity (step 905). The base authentication score is typically a number value that represents a previously existing and stored component of an overall authentication score for the user identity. In certain embodiments, the base authentication score is set based on the number and nature of the security credentials previously established for the user identity (i.e., during initial self-registration and any subsequent "step-up" authentication procedures) as well as based on a past history of user interactions with the integrated insurance system 108.

The base authentication score further depends on roles associated with the user identity. Specifically, if a default role is assigned to the user identity, then the base authentication score that is retrieved is the base authentication score for the default role. Otherwise, if no default role has been set, then the base authentication score is assigned to the lowest base authentication score for any of the roles associated with the user identity. Further, the base authentication score is modified (lowered) after retrieval if invalid login credentials were supplied (e.g., if a predetermined number of invalid login attempts are detected).

After receiving valid login credentials, the security module sets a dynamic authentication score for the user identity and role (step 910). The dynamic authentication score represents a temporary adjustment to the base authentication score, effective only for the current user activity session, based on user activities and external events. The dynamic authentication score may depend on a type of user device used to access the integrated insurance system 108. A less secure device (e.g., a mobile phone) results in a lower dynamic authentication score than a more secure device (e.g., a desktop computer). The dynamic authentication depends on the particular credentials supplied by the user, from among the potentially larger number of credentials established by the user, to login during the current activity session. Further, the dynamic authentication score may depend on an IP address used to access the integrated insurance system 108 relative to a history of IP address use. In some embodiments, the overall user authentication score during an activity session is represented as the sum of the base authentication score and the dynamic authentication score, i.e., authentication score=base authentication score+dynamic authentication score.

Next, the security module 520 waits (step 915) for one of a number of predetermined events to occur.

Upon receiving a user request to increase a set of access rights for a given computerized insurance service (step 920), the security module 520 modifies either the base or the dynamic authentication score. In particular, the security module 520 determines if the request for access rights is for a temporary increase in the access rights (step 953). If so, the security module 520 modifies the dynamic authentication score (step 965). Otherwise, the secure module 520 modifies the base authentication score (step 960). The security module then returns to the wait state (915) for one of the predetermined number of events to again occur (i.e., at steps 920, 925, 930, 935, and 940) during the current activity session.

Upon receiving a user request to change access settings via the My Security utility 529 (step 925), the security module 520 modifies the base authentication score. For example, a user may wish to permanently establish additional security credentials using the My Security utility 529. If the additional security credentials are properly established, the security module 520 would increase the base authentication score accordingly. On the other hand, if the attempt to establish additional security credentials fails (e.g., a user fails to follow through with a visit to a third-party testing facility for identity verification), the security module 520 would decrease the base authentication score. The security module then returns to the wait state (915) for one of the predetermined number of events to again occur (i.e., at steps 920, 925, 930, 935, and 940) during the current activity session.

Upon receiving a user request to change settings via the My Profile utility (step 930), the security module 520 modifies the base authentication score. For example, a user may elect to change account delivery preferences from e-mail to traditional paper delivery. In certain embodiments, the security module 520 would lower a base authentication score in response since paper is typically less secure, and results in an increased chance of account exposure to unwanted third parties, compared to e-mail delivery. The security module then returns to the wait state (915) for one of the predetermined number of events to again occur (i.e., at steps 920, 925, 930, 935, and 940) during the current activity session.

Upon detecting a predetermined non-user action (step 935), the security module 520 modifies either the base or the dynamic authentication score. As an illustrative example, after a user has logged in to the integrated insurance system 108, the integrated insurance system 108 may additionally detect another attempt to login using the user identity (e.g., from an unfamiliar IP address). In this case, the security module would significantly reduce the base authentication score associated with the user identity. Security module 520 is also capable of modifying the dynamic authentication score associated upon detecting one of a predetermined number of non-user actions. For example, if the security module 520 detects a user IP address dynamically changing to a new IP address (for example, due to the user roaming on a mobile device), the security module 520 may increase the dynamic authentication score. The security module then returns to the wait state (915) for one of the predetermined number of events to again occur (i.e., at steps 920, 925, 930, 935, and 940) during the current activity session.

Upon waiting a predetermined amount of time since a user activity (step 940), the security module 520 modifies the dynamic authentication score. For example, the predetermined amount of time may correspond to 10 minutes. Thus, whenever 10 minutes elapses without user activity, the dynamic authentication score is decreased. The security module then returns to the wait state (915) for one of the predetermined number of events to again occur (i.e., at steps 920, 925, 930, 935, and 940) during the current activity session.

An administrator of the integrated insurance system 108 may makes changes, directly or indirectly, to the user authentication score when the user is offline. Upon receiving user administrative changes (step 950), the security module 520 modifies the base authentication score. As an example, a customer of the insurance company may call to inform the insurance company that his home was recently burglarized or that he was a victim of identity theft in some other (non-insurance) context, an employee of the insurance company may manually adjust the base authentication score to reflect this fact. Administrative changes may be entered using company terminals 122. In some embodiments, the company terminals execute computer software that allows an administrator to directly adjust an authentication score for a user identity and corresponding role(s). In other embodiments, the administrator specifies a set of access rights or a desired modification of the set of access rights and the integrated insurance system 108 automatically determines a suitable adjustment to the authentication score for the user identity and the corresponding role(s).

The security module 520 may automatically make off-line changes, directly or indirectly, to the user authentication score (step 955). For example, the integrated insurance system 108 may automatically detect that the user identity of a family member of a given user has been compromised through the means described above. In this case, the security module 520 may lower the base authentication score for all user identities belonging to individuals living in the same household.

In some embodiments, rather than use a variable authentication score, the threshold authentication score values described in this disclosure are variable with respect to events that occur after a user activity session begins.

Although the base authentication score and dynamic authentication score are described throughout the disclosure primarily as positive integer values, it would be understood by one of ordinary skill that the base authentication score and/or the dynamic authentication score may be represented using other techniques. For example, the base authentication score and dynamic authentication score may also be represented as percentage values (e.g., between 0 and 100 percent), by using a finite number of authentication levels (i.e., where each level is a quantitative or qualitative value), by any other discrete or continuous valued parameter, as a tranche value (e.g., the top 5%, 10%, or 20% of authentication scores across all accounts registered with the front-end computing system 109), or by any suitable combination of these and other representations.

Figure 10:
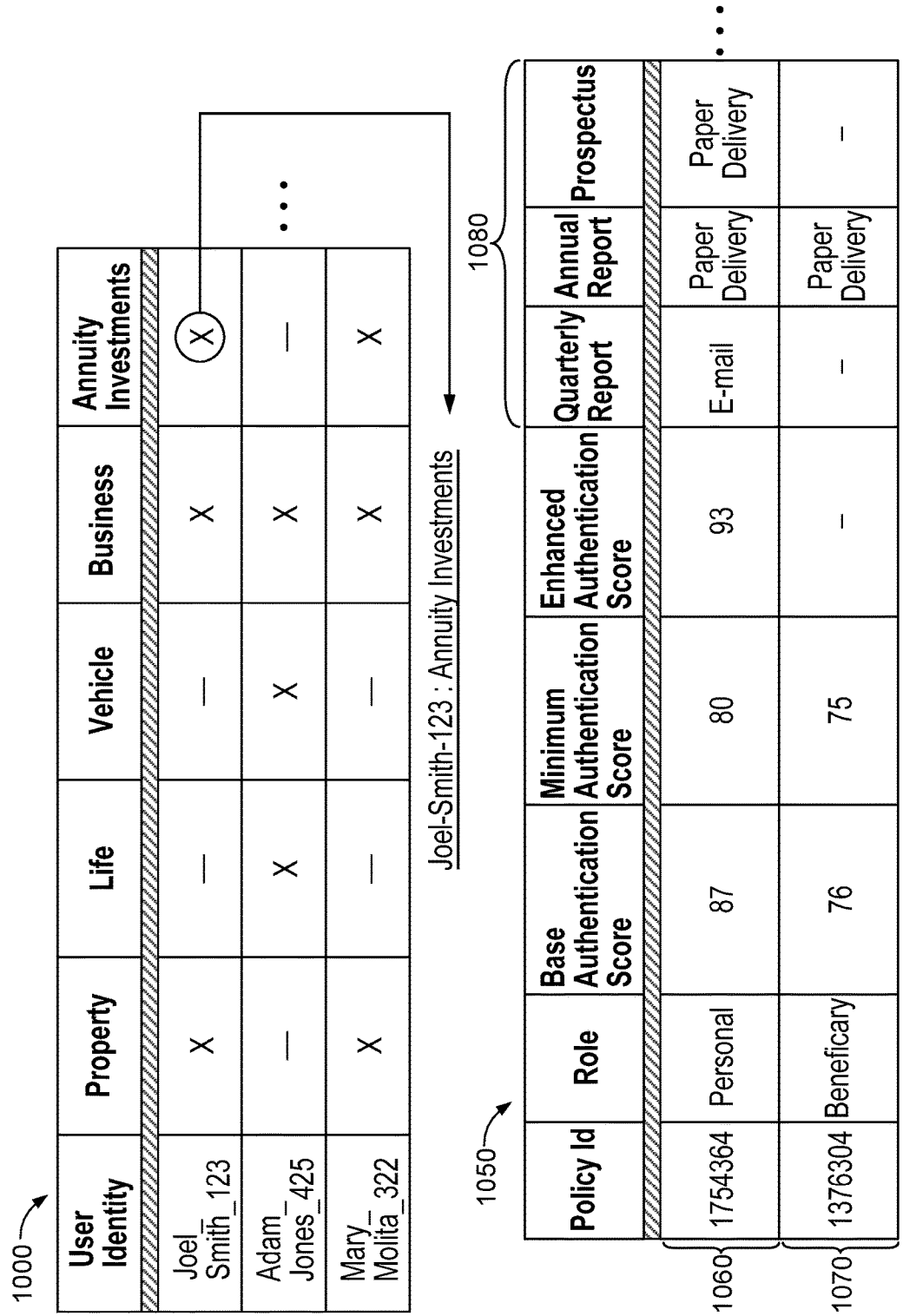
FIG. 10 depicts illustrative data structures for storing profile, security, and other information for user accounts according to an illustrative embodiment of the invention.

FIG. 10 depicts illustrative data structures for storing profile, security, and other information for user accounts according to an illustrative embodiment of the invention. Specifically, data structure 1000 illustrates the storage of user identities and the corresponding computerized insurance services used by those user identities, while data structure 1050 illustrates the storage of profile, security, role, and other information for a given user identity and computerized insurance service. The data structures 1000 and 1050 represent the logical storage of data and the data may itself be stored on any appropriate storage medium using storage techniques that would be understood by those of ordinary skill.

Data structure 1000 illustrates the storage of user identities and the corresponding computerized insurance services used by those user identities. In particular, FIG. 10 illustrates the storage of three user identities and variables indicating the registered insurance services for each of these user identities. As illustrated, the user identity Joel_Smith_123 has access to (denoted by the symbol "x") property, business, and annuity investment services, but does not have access to (denoted by the symbol "-") life or vehicle insurance services. Similarly, the user identity Adam_Jones_425 has access to life, vehicle, and business insurance services, but does not have access to property or annuity investment services. Additionally, the user identity Mary_Molita_322 has access to property, business, and annuity investment services, but does not have access to life or vehicle insurance services. Further, although not shown in FIG. 10, the data structure 100 stores information on whether the user identities of Joel_Smith_123, Adam_Jones_425, and Mary_Molita_322 are registered for additional insurance services (denoted by the ellipses) and stores information on additional user identities. In some embodiments, the elements of the data structure 1000 (i.e., denoted by "x" or "-") are implemented as a binary-valued variables. In some embodiments, a user identity is considered to have access to a given insurance service if at least one role associated with the user identity has access to the computerized insurance service based on the base authentication score of that role.

Data structure 1050 illustrates the storage of profile, security, role, and other information for a given user identity and a given computerized insurance service from the computerized insurance services 102. In particular, data structure 1050 illustrates the storage of information related to Joel_Smith_123's access to annuity investments. As illustrated in FIG. 10, Joel_Smith_123 is affiliated with the annuity investment service through a "personal" role and a "beneficiary" role. Some of the information stored in connection with the personal role is displayed in row 1060 and some of the information stored in connection with the beneficiary role is displayed in row 1070. For example, row 1060 indicates the storage of, in addition to the role, a policy ID, the base authentication score for the role, and a minimum authentication score required to access a corresponding annuity investment service (i.e., the annuity investment service).

Further, row 1060 indicates the storage of an enhanced authentication score, which indicates an authentication score required for access to one or more enhanced access rights within the annuity investment service. For example, the enhanced authentication score may indicate a score required to withdraw funds from the annuity and to change beneficiary information associated with the annuity. As another example, for a life insurance computerized insurance service, the enhanced authentication score may indicate a score required to modify coverage amounts and file a claim online using the life insurance service. Further, row 1060 indicates the storage of delivery preferences 1080 associated with the user identity Joel_Smith_123 with the annuity investment service in the role of "personal" and in connection with policy ID 1754364.

Although not explicitly illustrated in FIG. 10, more than one policy ID may be associated with a given user identity and role. For example, Joel Smith may be a beneficiary with respect to the annuity investment service on a second policy in addition to the policy having an ID of 1754364, which is depicted in data structure 1050. Although not explicitly shown in FIG. 10, data structure 1050 may store additional information related to a given user identity, role, and policy ID. For example, sets of access rights associated with some or all of the base authentication score, minimum authentication score, and enhanced authentication score may be stored by the data structure 1050.

In some embodiments, the data structure 1050 depends from the data structure 1000 according to a nested implementation. For example, a data structure of the form of the data structure 1050 may associated with, and stored in connection to, each element from the data structure 1000. In some embodiments, the data structures 1000 and 1050 are stored using a linked-list hierarchical structure. In some implementations, the data structures 1000 and 1050 are stored using a three-dimensional matrix-type implementation structure, where a given entry of a two-dimensional matrix representing the data structure 1000 stores the information corresponding to the data structure 1050.

FIG. 10 depicts data structures for the purposes of illustration, and not limitation. As would be understood by one of ordinary skill, profile, security, and other information for user accounts may be stored using suitable permutations of the data described in relation to the data structures 1000 and 1050. Further, some of the data illustrated in connection with one of these data structures may be stored in other data structures without departing from the scope of the disclosure.

Global accounts for the front-end computing system 109 have been described in the disclosure herein primarily as follows. Each user of the front-end computing system 109 is assigned a unique user identity, which may then be associated with one or more roles. However, it will be understood by one of ordinary skill that the front-end computing system 109 may be implemented using a different structure for the assignment user identities and roles to users. In some embodiments, a user of the front-end computing system 109 is assigned a different user identity for each role recognized by the front-end computing system 109. For example, a single user would have a different user identity for each of "claimant," "personal," and "business" roles with the front-end computing system 109. Further, the various user identities for a given user may be used with a single common set of established security credentials, or a different set of established security credentials may be assigned to each user identity.

In some embodiments, each user of the front-end computing system 109 is assigned a unique user identity and the security credentials (e.g., a password) provided during login determines which role is used when the user logs in to the front-end computing system 109. For example, a user, Joel Smith, may be assigned a user identity of Joel_Smith_123. Joel Smith may also be assigned two different passwords (or, more generally, two different sets of security credentials) corresponding to two different roles (e.g., a "claimant" role and a "business" role). Joel Smith would then enter the password corresponding to the desired role when logging in to the front-end computing system 109 for a given activity session. In some embodiments, the different roles for Joel Smith are linked. For example, Joel Smith may login using the "claimant" role and may be able to select the "business" role via the graphical user interface 300. Alternatively, the two roles may be distinct, and Joel Smith may be required to login with the password corresponding to the "claimant" role to access the front-end computing system 109 according to this role.

While preferable embodiments of the present invention have been shown and described herein, it will be obvious to those of ordinary skill that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for processing electronic access requests to a plurality of computerized back-end services operating on a plurality of distinct computer platforms, the system comprising:
   a front-end computing system connected to the plurality of computerized back-end services by a data network, the front-end computing system including:
      a network interface configured to communicate with a user computing device located remotely to the system and the plurality of computerized back-end services operating on the plurality of distinct computer platforms,
      a profile utility including a merge or link service and a role management service; and
      a security utility including an information collection service, and a data verification service;
   wherein the front-end computing system is configured to:
      receive, by a call from one of the plurality of computerized back-end services, via the security utility, a registration request for a user identity; and
      in response to the registration request:
         invoke, by the security utility, the information collection service to collect one or more secure information items associated with the user identity;
         invoke, by the security utility, the data verification service to determine, based on the one or more collected secure information items associated with the user identity, a verification score, and responsive to determining that the determined verification score exceeds a threshold value, register a global user account for the user identity;
         invoke, by the profile utility, the merge or link service to query the plurality of computerized back-end services to determine whether one or more pre-existing user accounts have been created corresponding to the user identity, and, responsive to identification of the one or more pre-existing user accounts by the computerized back-end services, merge or link the identified one or more pre-existing user accounts for the plurality of computerized back-end services with the global user account; and
         invoke, by the profile utility, the role management service, to determine a plurality of roles for the user identity in relation to each of one or more computerized back-end services associated with the global user account.

2. The system of claim 1, wherein the security utility further comprises a credential service, and wherein the front-end computing system is further configured to invoke, by the security utility, the credential service to establish one or more security credentials for the global user account associated with the user identity.

3. The system of claim 1, wherein the security utility further comprises an authentication score management service, and wherein the front-end computing system is further configured to invoke, by the security utility, the authentication score management service to determine an initial authentication score for each of the plurality of roles for the user identity.

4. The system of claim 1, wherein the plurality of roles includes at least one of a personal role, a claimant role, a beneficiary role, an agent role, and a business role.

5. The system of claim 1, wherein the front-end computing system is further configured to:
   import at least one security credential from either one of the plurality of computerized back-end services or from a trusted third-party affiliate, wherein the imported security credential has been previously established for the user identity;
   establish a security credential for the global user account based upon the imported at least one security credential.

6. The system of claim 1, wherein the plurality of computerized back-end services comprises at least one of a 401(k) retirement service and an annuity investment service.

7. The system of claim 1, wherein the plurality of computerized back-end services comprise one or more of a health risk mitigation service, a fire risk mitigation service, a life risk mitigation service, a vehicle risk mitigation service, a business risk mitigation service, a mutual fund service, an annuity service, a college savings plan service, and a retirement plan service.

8. The system of claim 1, wherein the front-end computing system is further configured to:
   determine whether each of the one or more pre-existing user accounts is substantially compatible with the global user account;
   responsive to an affirmative determination that one of the one or more pre-existing user accounts is substantially compatible with the global user account, merge the one of the one or more pre-existing user accounts with the global user account; and
   responsive to a negative determination that another one of the one or more pre-existing user accounts is substantially compatible with the global user account, link the another one of the one or more pre-existing user accounts to the global user account.

9. The system of claim 1, wherein the front-end computing system further includes a portal module, and wherein the front-end computing system is further configured to:
   provide, by the portal module, instructions for display of a graphical user interface to the user computing device for submitting the registration request for the user identity; and
   receive, from the user computing device, the registration request for the user identity.

10. A computer-implemented method for processing a registration request for electronic access to a plurality of computerized back-end services operating on a plurality of distinct computer platforms, the method comprising:
    communicating by a network interface with the plurality of computerized back-end services operating on the plurality of distinct computer platforms and with a user computing device located remotely to a front-end computing system;
    receiving, by the front-end computing system, the registration request for a user identity; and
    in response to the registration request:
       invoking, by a security utility of the front-end computing system, an information collection service to collect one or more secure information items associated with the user identity;
       invoking, by the security utility of the front-end computing system, a data verification service of the security utility to determine, based on the one or more collected secure information items associated with the user identity, a verification score, and responsive to determining that the determined verification score exceeds a threshold value, registering a global user account for the user identity;

invoking, by a profile utility of the front-end computing system, a merge or link service of the profile utility to query the plurality of computerized back-end services to determine whether one or more pre-existing user accounts have been created corresponding to the user identity, and, responsive to identification of the one or more pre-existing user accounts by the computerized back-end services, merge or link the identified one or more pre-existing user accounts for the plurality of computerized back-end services with the global user account; and invoking, by the profile utility of the front-end computing system, a role management service of the profile utility, to determine a plurality of roles for the user identity in relation to each of one or more computerized back-end services associated with the global user account.

11. The method of claim 10, further comprising:
automatically sending queries for pre-existing account information to at least some of the plurality of computerized back-end services; and
determining, based on responses to the queries, the plurality of roles without receiving input from the user computing device.

12. The method of claim 10, wherein the plurality of roles includes at least of a personal role, a claimant role, a beneficiary role, an agent role, and a business role.

13. The method of claim 10, further comprising:
establishing, by the front-end computing system, at least one security credential for the global user account by importing a security credential from either one of the plurality of computerized back-end services or from a trusted third-party affiliate, wherein the imported security credential has been previously established for the user identity.

14. The method of claim 10, wherein the plurality of computerized back-end services comprises at least one non-property risk mitigation service.

15. The method of claim 10, wherein the plurality of computerized back-end services comprise one or more of a health risk mitigation service, a fire risk mitigation service, a life risk mitigation service, a vehicle risk mitigation service, a business risk mitigation service, a mutual fund service, an annuity service, a college savings plan service, and a retirement plan service.

16. The method of claim 10, further comprising:
determining, by the front-end computing system, whether each of the one or more pre-existing user accounts is substantially compatible with the global user account;
responsive to an affirmative determination that one of the one or more pre-existing user accounts is substantially compatible with the global user account, merging, by the front-end computing system, the one of the one or more pre-existing user accounts with the global user account; and
responsive to a negative determination that another one of the one or more pre-existing user accounts is substantially compatible with the global user account, linking, by the front-end computing system, the another one of the one or more pre-existing user accounts to the global user account.

17. A system for processing a registration request for electronic access to a plurality of computerized back-end services operating on a plurality of distinct computer platforms, the system comprising:
the plurality of computerized back-end services connected by a data network;
a front-end computing system connected to the plurality of computerized back-end services by the data network, the front-end computing system including;
a network interface configured to communicate with a user computing device located remotely to the system and the plurality of computerized back-end services operating on the plurality of distinct computer platforms,
a profile utility including a merge or link service and a role management service; and
a security utility including an information collection service, a data verification service, a credential service, and an authentication score management service;
wherein the front-end computing system is configured to:
receive, by a call from one of the plurality of computerized back-end services, via the security utility, the registration request for a user identity; and
in response to the registration request:
invoke, by the security utility, the information collection service to collect one or more secure information items associated with the user identity;
invoke, by the security utility, the data verification service to determine, based on the one or more collected secure information items associated with the user identity, a verification score, and responsive to determining that the determined verification score exceeds a threshold value, register a global user account for the user identity;
invoke, by the security utility, the credential service to establish one or more security credentials for the global user account associated with the user identity;
invoke, by the profile utility, the merge or link service to query the plurality of computerized back-end services to determine whether one or more pre-existing user accounts have been created corresponding to the user identity, and, responsive to identification of the one or more pre-existing user accounts by the computerized back-end services, merge or link the identified one or more pre-existing user accounts for the plurality of computerized back-end services with the global user account;
invoke, by the profile utility, the role management service, to determine a plurality of roles for the user identity in relation to each of one or more computerized back-end services associated with the global user account; and
invoke, by the security utility, the authentication score management service to determine an initial authentication score for each of the plurality of roles for the user identity.

18. The system of claim 17, wherein the front-end computing system is further configured to:
import at least one security credential from either one of the plurality of computerized back-end services or from a trusted third-party affiliate, wherein the imported security credential has been previously established for the user identity;
establish a security credential for the global user account based upon the imported at least one security credential.

19. The system of claim 18, wherein the front-end computing system is further configured to:

determine whether each of the one or more pre-existing user accounts is substantially compatible with the global user account;

responsive to an affirmative determination that one of the one or more pre-existing user accounts is substantially compatible with the global user account, merge the one of the one or more pre-existing user accounts with the global user account; and responsive to a negative determination that another one of the one or more pre-existing user accounts is substantially compatible with the global user account, link the another one of the one or more pre-existing user accounts to the global user account.

20. The system of claim 19, wherein the front-end computing system is further configured to:

automatically send queries for pre-existing account information to at least some of the plurality of computerized back-end services; and determine, based on responses to the queries, the plurality of roles without receiving input from the user computing device.

* * * * *